US00RE50416E

(19) United States
(12) Reissued Patent
Madabhushi et al.

(10) Patent Number: US RE50,416 E
(45) Date of Reissued Patent: May 6, 2025

(54) QUALITY CONTROL FOR DIGITAL PATHOLOGY SLIDES

(71) Applicant: Case Western Reserve University, Cleveland, OH (US)

(72) Inventors: Anant Madabhushi, Shaker Heights, OH (US); Andrew Janowczyk, East Meadow, NY (US)

(73) Assignee: Case Western Reserve University, Cleveland, OH (US)

(21) Appl. No.: 18/076,652

(22) Filed: Dec. 7, 2022

Related U.S. Patent Documents

Reissue of:
(64) Patent No.: 10,861,156
Issued: Dec. 8, 2020
Appl. No.: 16/246,650
Filed: Jan. 14, 2019

U.S. Applications:
(60) Provisional application No. 62/636,383, filed on Feb. 28, 2018.

(51) Int. Cl.
*G06T 7/00* (2017.01)
*G06T 5/00* (2024.01)
*G06T 5/70* (2024.01)

(52) U.S. Cl.
CPC ..... *G06T 7/0014* (2013.01); *G06T 5/70* (2024.01); *G06T 2207/20081* (2013.01); *G06T 2207/30024* (2013.01); *G06T 2207/30168* (2013.01)

(58) Field of Classification Search
CPC ..... G06T 7/0014; G06T 5/002; G06T 2207/20081; G06T 2207/30024;
(Continued)

(56) References Cited

U.S. PATENT DOCUMENTS 6,330,348 B1 * 12/2001 Kerschmann ..... G01N 1/06 382/128
8,023,714 B2 * 9/2011 Soenksen ..... G06T 7/0012 382/132

(Continued)

OTHER PUBLICATIONS

Notice of Allowance dated Aug. 12, 2020 for U.S. Appl. No. 16/246,650.

*Primary Examiner* — Robert L Nasser
(74) *Attorney, Agent, or Firm* — Eschweiler & Potashnik, LLC

(57) ABSTRACT

Embodiments include accessing a set of digital pathology (DP) images having an imaging parameter; applying a low-computational cost histology quality control (HistoQC) pipeline to the DP images, where the low-computational cost HistoQC pipeline computes a first set of image metrics associated with a DP image, and assigns the DP image to a first or a second, different cohort based on the imaging parameter and the first set of image metrics; applying a first, higher-computational-cost HistoQC pipeline to a member of the first cohort; applying a second, different higher-computation-cost HistoQC pipeline to a member of the second cohort; where the first or second, higher-computational-cost HistoQC pipeline determines an artifact-free region of the member of the first or second cohort, respectively, and classifies the member of the first or second cohort, respectively, as suitable or unsuitable for downstream computation or diagnostic analysis based, at least in part, on the artifact free region.

31 Claims, 12 Drawing Sheets

210 220

(58) Field of Classification Search
CPC . G06T 2207/30168; G06T 2207/10056; G06T 7/0002; G06T 7/0012; G02B 21/365
See application file for complete search history.

(56) References Cited

U.S. PATENT DOCUMENTS

| | | | | |
|---|---|---|---|---|
| 10,102,625 | B2 * | 10/2018 | Shanghvi | A61B 6/463 |
| 10,438,096 | B2 | 10/2019 | Lesniak | |
| 10,509,218 | B2 * | 12/2019 | Watanabe | G02B 21/365 |
| 2006/0159367 | A1 * | 7/2006 | Zeineh | G06T 7/0012 382/276 |
| 2007/0012886 | A1 * | 1/2007 | Tearney | G06T 7/0014 250/459.1 |
| 2008/0219530 | A1 * | 9/2008 | Levanon | A61B 6/504 382/130 |
| 2009/0082637 | A1 * | 3/2009 | Galperin | G16H 30/20 600/300 |
| 2012/0014576 | A1 * | 1/2012 | Olson | G16H 30/20 382/128 |
| 2015/0324997 | A1 * | 11/2015 | Murakami | G06T 5/00 348/207.1 |
| 2016/0307305 | A1 * | 10/2016 | Madabhushi | G06K 9/6212 |
| 2017/0098310 | A1 * | 4/2017 | Chefd'hotel | G06T 7/13 |
| 2017/0337695 | A1 * | 11/2017 | Sarkar | G06V 20/69 |
| 2018/0129911 | A1 * | 5/2018 | Madabhushi | G06T 3/40 |

* cited by examiner 210 220

410

420

QUALITY CONTROL FOR DIGITAL PATHOLOGY SLIDES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application *is a reissue of U.S. Pat. No. 10,861,156, issued on Dec. 8, 2020, filed Jan. 14, 2019, which itself* claims the benefit of U.S. Provisional Application 62/636,383 filed Feb. 28, 2018, [which is incorporated by reference herein in its entirety] *the disclosures of which are hereby incorporated by reference in their entireties.*

FEDERAL FUNDING NOTICE

This invention was made with government support under the grant(s) CA199374, CA202752, CA208236, CA216579, CA220581, and DK007470 awarded by the National Institutes of Health. The government has certain rights in the invention.

BACKGROUND

Digital pathology (DP) is a part of both clinical diagnostic workflows and computational pathology. DP refers to the digitization of tissue slides, including the digitization of histology slides. One of the challenges in DP is the presence of presentation differences, including artifacts or batch effects introduced during slide preparation as well as during slide digitization. Manual review of glass and digital slides is laborious, qualitative, and subject to inter-reviewer as well as intra-reviewer variability. Thus, a reproducible, automated approach for precisely locating presentation differences, including artifacts or batch effects in DP slides to identify DP slides which need to be reproduced or repaired, or regions in the DP slide which should be avoided during computational analysis, would be advantageous in clinical diagnostic workflows and computational pathology.

BRIEF DESCRIPTION OF THE DRAWINGS

The accompanying drawings, which are incorporated in and constitute a part of the specification, illustrate various example operations, apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that, in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Definitive disease diagnosis routinely takes place via visual inspection by a pathologist of a tissue slide under a microscope. Before this can take place, the tissue slide itself must be created. This process, which involves gross organ dissection, selection of and preparation of tissue blocks for slide creation, microtomy (i.e., cutting and tissue placement on the slide), staining, and coverslipping, is fraught with multiple pre-analytic opportunities for the introduction of artifacts and batch effects. These artifacts may include artifacts caused by improper tissue placement (e.g., folding, compressing, tearing, air bubbles), improper reagents (e.g., over/under staining, stain concentration differences, stain batch variation), and poor microtomy (e.g., knife chatter, thickness variances). The increasingly popular digitization of these same slides, used in computational diagnostic approaches, introduces yet another source of artifacts. These DP slides may additionally include digitization artifacts such as blurriness, lighting, and contrast issues, as well as implicit scanner differences (e.g., microns per pixel (MPP), diversity of compression and stitching algorithms), which may result in batch effects. Taken all together, there are innumerable combinations of pre-analytic variances that may result in consequential differences in slide presentation and quality, which may impact clinical applications, including diagnosis.

These same artifacts and variances may negatively affect downstream clinical and research workflows. In an analog workflow, continuous quality control and process is limited, unlike laboratory medicine which relies on continuous statistical process control. Clinically, slides rejected on quality grounds represent a drag on the clinical pathology workflow since these slides either need to be recut or rescanned, in turn causing additional delays and unnecessary cost, which may also have a negative impact on patient outcomes. From a research standpoint, artifacts or batch effects may be sources of noise which can adversely impact the development and validation of analytical classifiers for tasks such as disease detection, diagnosis, and prognosis. This is especially important for increasingly popular deep learning and machine learning based approaches, which rely on well annotated and relatively artifact free images to learn underlying disease specific representations.

Figure 1:
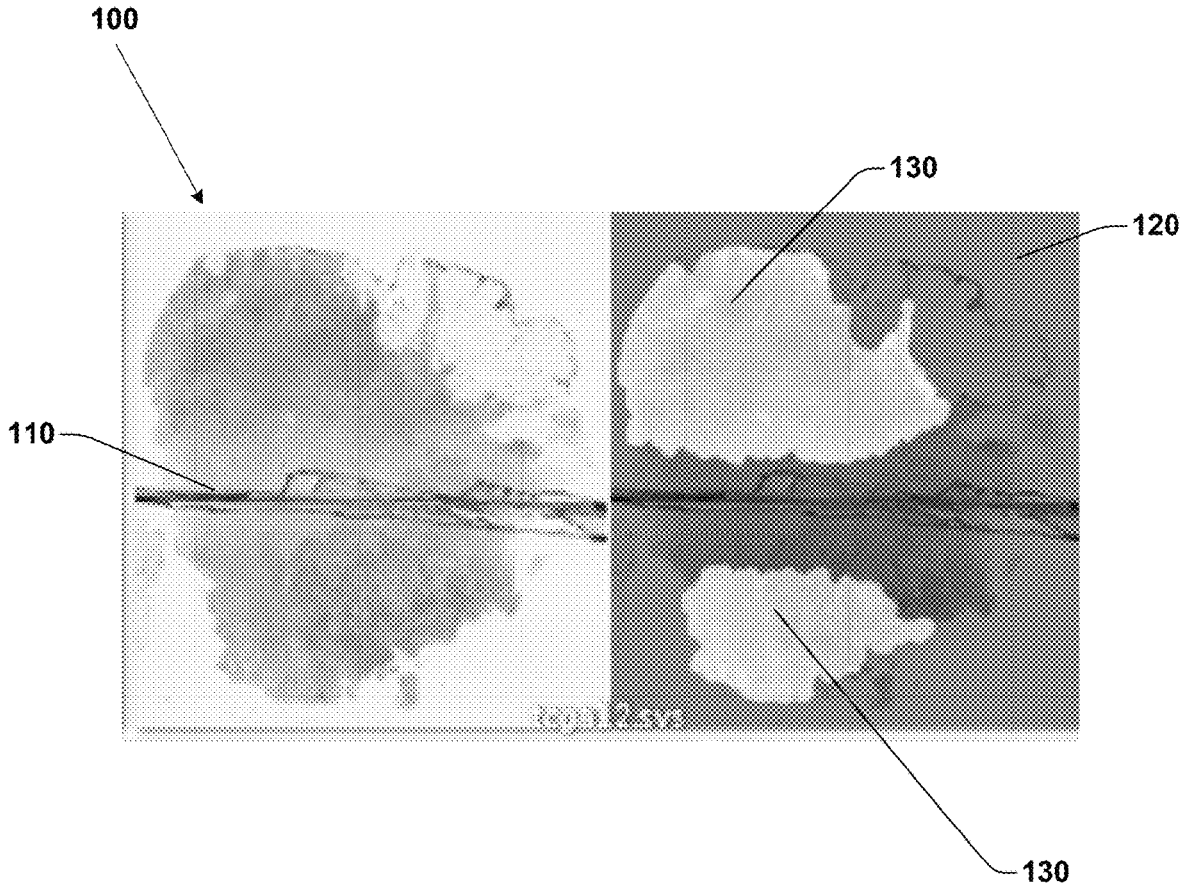
FIG. 1 illustrates a DP slide exhibiting an artifact
Figure 2:
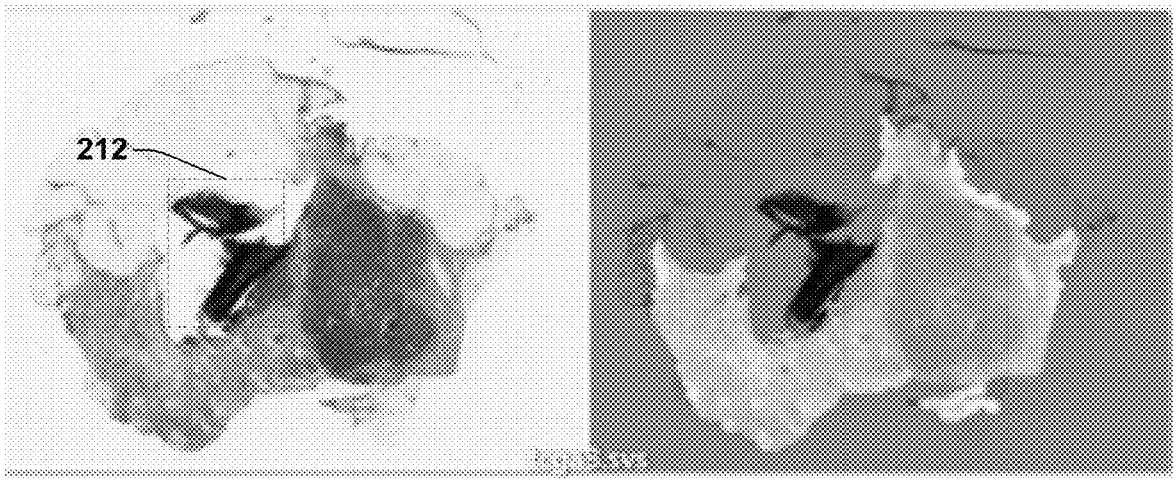
FIG. 2 illustrates a DP slide exhibiting an artifact
Figure 3:
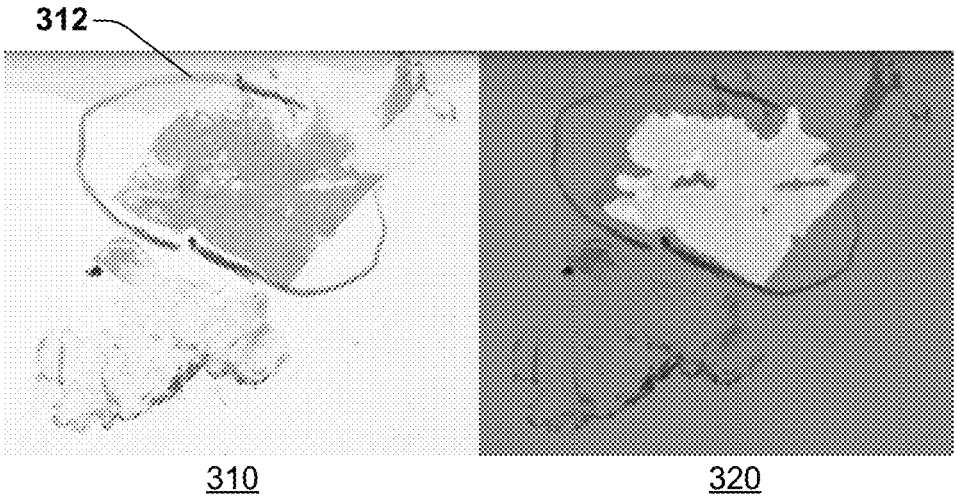
FIG. 3 illustrates a DP slide exhibiting an artifact.

Existing quality control (QC) processes for clinical and research applications are performed manually, making the process subjective, labor-intensive, slow, and error prone. For instance, a wide spectrum of artifacts and image qualities (see FIGS. 1-3) can be seen in many of the 30,000 digitized tissue slides hosted by The Cancer Genome Atlas (TCGA). For example, FIG. 1 illustrates a DP slide 100 exhibiting blurry tissue near a coverslip crack 110. FIG. 2 illustrates a DP slide 210 exhibiting folded tissue 212. FIG. 3 illustrates a DP slide 310 exhibiting pen markings 312. These artifacts exist in the TCGA slides in spite of the fact that these slide images underwent manual QC prior to introducing them into TCGA. Additionally, more subtle artifacts, which might not even be perceivable to a human eye, such as variations in stain, slide thickness, compression, texture differences in tissue presentation, differences in microns per pixel, or blurring, that may not affect a pathologist's diagnostic interpretation, or which are impossible or unlikely to be perceived during manual QC, may still have implications for subsequent computational image analysis and machine learning algorithms. For instance, technical artifacts caused by the preparation facility (i.e., batch effects), may be confounded with the biological signal under investigation. Thus, an improved, automated, comprehensive, and integrated QC review of digital pathology slide images would be advantageous for improved, more accurate clinical and research applications.

Presentation differences may include artifacts or batch effects. Artifacts may include, for example, technical artifacts which are defined as non-biological factors that affect presentation or measurements in an experimental study (e.g., a compression algorithm used in digital pathology slides). Batch effects are the systematic occurrence of a technical artifact within a subset of a cohort. For example, the preferred tissue thickness may be different between two institutions, creating a batch effect if those slides were evaluated in unison. Batch effects require special management in experimental designs since they are known to impede the success of bioinformatics experiments (e.g., mutation-calling and gene-expression). This is also true in the case of digital pathology. Consider the following example. Facility A produces thick slices which also belong to a positive target class, while Facility B produces thin slices which also belong to a negative target class. When studied together, one must be very careful to make sure that the learned model is in fact focusing on the target class, as opposed to solely the tissue thickness.

Figure 4:
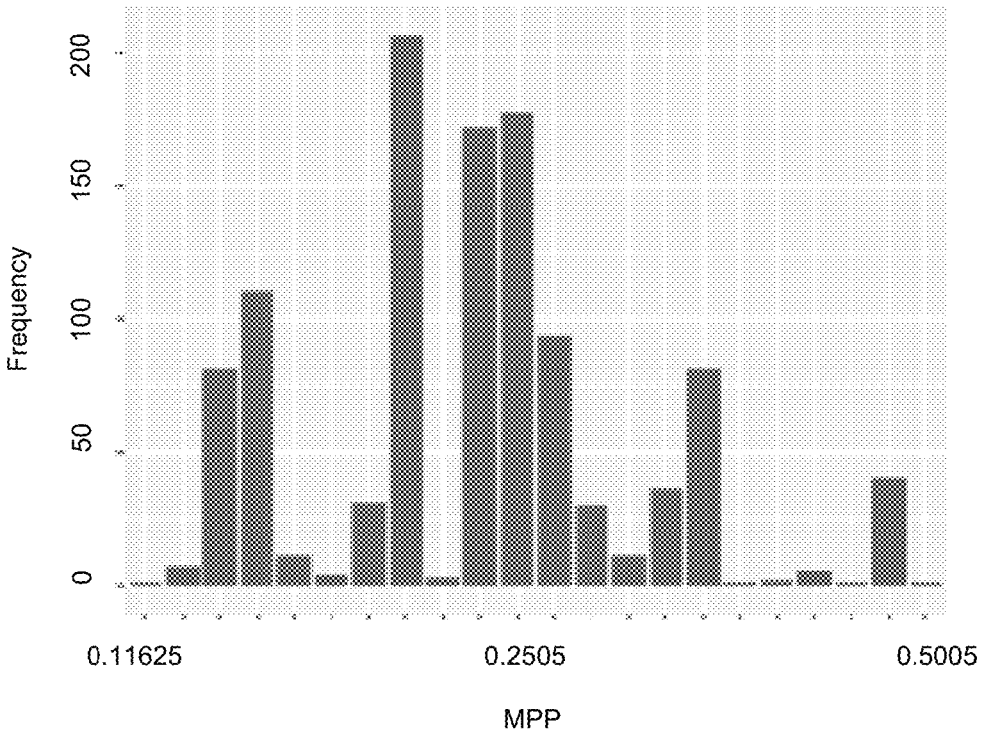
FIG. 4 illustrates histograms demonstrating batch effects and heterogeneity in a plurality of DP slides.
Figure 4:
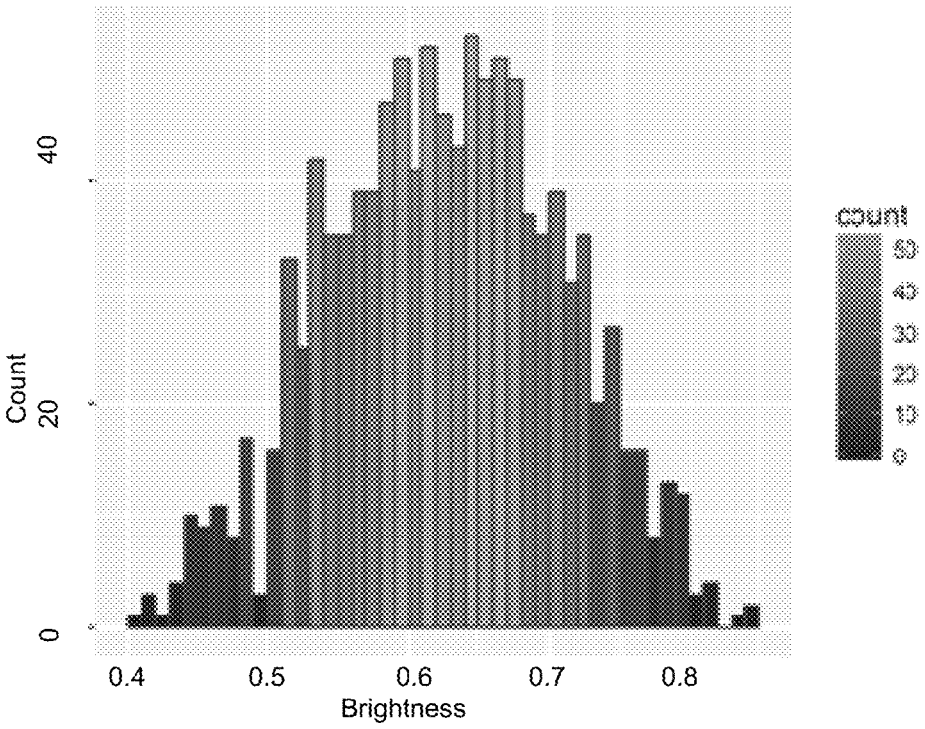

FIG. 4 includes histograms 410 and 420 which illustrate batch effects and heterogeneity in TCGA-BRCA slides. Histogram 410 illustrates batch effects in microns per pixel (MPP), while histogram 420 illustrates heterogeneity in brightness. FIG. 4 illustrates that MPP heterogeneity illustrated in histogram 410 does not produce a Gaussian distribution, while the brightness metric illustrated in histogram 420 does. When comparing images at the extremes of either spectrum, significant differences in presentation and algorithm performance may occur. Embodiments facilitate automatically identifying the extent of heterogeneity with respect to slide preparation and color variance, including for single slides, or a plurality of slides, so that appropriate steps can be taken to harmonize slide image appearance, thus improving downstream computational algorithmic performance. For example, as illustrated by histogram 420, the likelihood that a single brightness threshold value would provide a consistent result across the visualized cohort is low. As such, the heterogeneity reflects implicitly the fact that the cohort is actually comprised of smaller and distinct slide clusters with unique stain and preparation induced attributes. Embodiments thus facilitate defining optimal parameters for subsequent processing on a subset basis. Tuning the parameters for downstream applications (e.g., segmentation, training a machine learning classifier) per cluster results in a more robust performance of the system, circuit, apparatus, processor, computer, or other implementation of DP QC according to embodiments, as opposed to a global set of parameters attempting to describe the entire cohort. Embodiments that provide improved QC for DP slides used in training machine learning classifiers thus result in the technical effect of improved training and improved accuracy of machine learning classifiers trained on training sets subject to QC analysis by embodiments.

Embodiments further facilitate improved clinical outcomes. For example, by detecting or correcting for presentation differences, including batch effects or other artifacts, embodiments may remove variances in DP slides that may impact clinical workflows. Detecting or correcting for presentation differences, including batch effects or other artifacts, may thus decrease the chance of a pathologist making an error based on the presentation differences, since the pathologist's workload is decreased by the removal of the variance and subsequent removal of the need for the pathologist to compensate for the variance in clinical practice. In the case of a single slide, embodiments may detect presentation differences where a target range for a metric has been computed ahead of time, and where the DP image being analyzed demonstrates a metric that it outside the target range. Thus, in a clinical setting where slides may be entering a workflow one slide at a time (e.g., during surgery), or over the course of a workday, embodiments facilitate the detection of presentation differences, including batch effects or artifacts that may go undetected by existing QC approaches.

Embodiments include apparatus, circuits, methods, operations, systems, and other embodiments that employ a combination of image metrics (e.g., color histograms, brightness, contrast), image features (e.g., edge detectors, smoothness detectors) and supervised classifiers (e.g., pen detection classifier) to identify DP slides with presentation differences, including gross technical artifacts, artifact affected regions in DP slides which may not be suitable for computational analysis, and DP slide samples potentially affected by batch effects. Embodiments' modular nature facilitates the embedding of additional metrics, features, and artifact detection algorithms into embodiments as desired by users.

Embodiments may detect presentation differences, including artifacts or batch effects. A presentation difference may include, for example, an artifact or batch effect caused by stain deterioration on DP slides. The stains used on DP slides deteriorate over time, through oxidation or other environmental contaminations. Embodiments may declare a DP slide unsuitable for diagnostic purposes, unsuitable for downstream computation, or may identify that a DP slide has deviated a threshold amount from a standard target level of stain quality. Similarly, embodiments may identify failing lab equipment, including dull microtome blades or other equipment. A microtome blade may impart particular artifacts or batch effects to DP slides that change over the lifespan of the blade. For example, a microtome blade may, at a first, earlier point in its lifespan, be sharper and produce blade-sharpness artifacts at a lower rate than at a second, later, point in its lifespan, when it is duller. One type of blade-sharpness artifact that embodiments may detect is knife chatter. Embodiments may include modules that detect other blade-sharpness based artifacts, or other artifacts or batch effects based on hardware or equipment failure. Embodiments thus facilitate detecting presentation differences, including artifacts or batch effects, in near-real time, for example, as part of a process control approach. For example, embodiments may be employed in a clinical DP workflow at point between the preparation of the DP slide, and the use of the DP slide by a clinician for diagnostic purposes. Detecting stain deterioration, or equipment failure based artifacts or batch effects, in near-real time (i.e., as a DP slide is being processed by embodiments) facilitates improved clinical outcomes or improved downstream computational results, since errors in DP slides are detected and accounted for sooner (i.e., as they are detected) rather than later (i.e., after all the DP slides in a cohort have been processed). Embodiments thus improve on existing approaches to DP slide QC.

In one embodiment, a configuration file which defines the parameters of a histological quality control pipeline (HistoQC pipeline), such as which modules to execute, parameters associated with a module, and in what order to execute the modules, is accessed. In one embodiment, the configuration file is a default configuration file accessed by embodiments. In another embodiment, the configuration file may be supplied by a user. As the HistoQC pipeline is executed on the DP slide, relevant output images are created (e.g., masks, thumbnail images indicating regions of potential blurriness). Metadata (e.g., scanner type, magnification, microns per pixel (MPP)), and metrics are saved, in one example, in a tab separated value (TSV) file. DP image metrics may be computed on the entire slide (i.e., including the background), may be limited solely to regions containing detected tissue, may be limited to a region defined by a mask, or may be limited to a window of a particular size.

Figure 5:
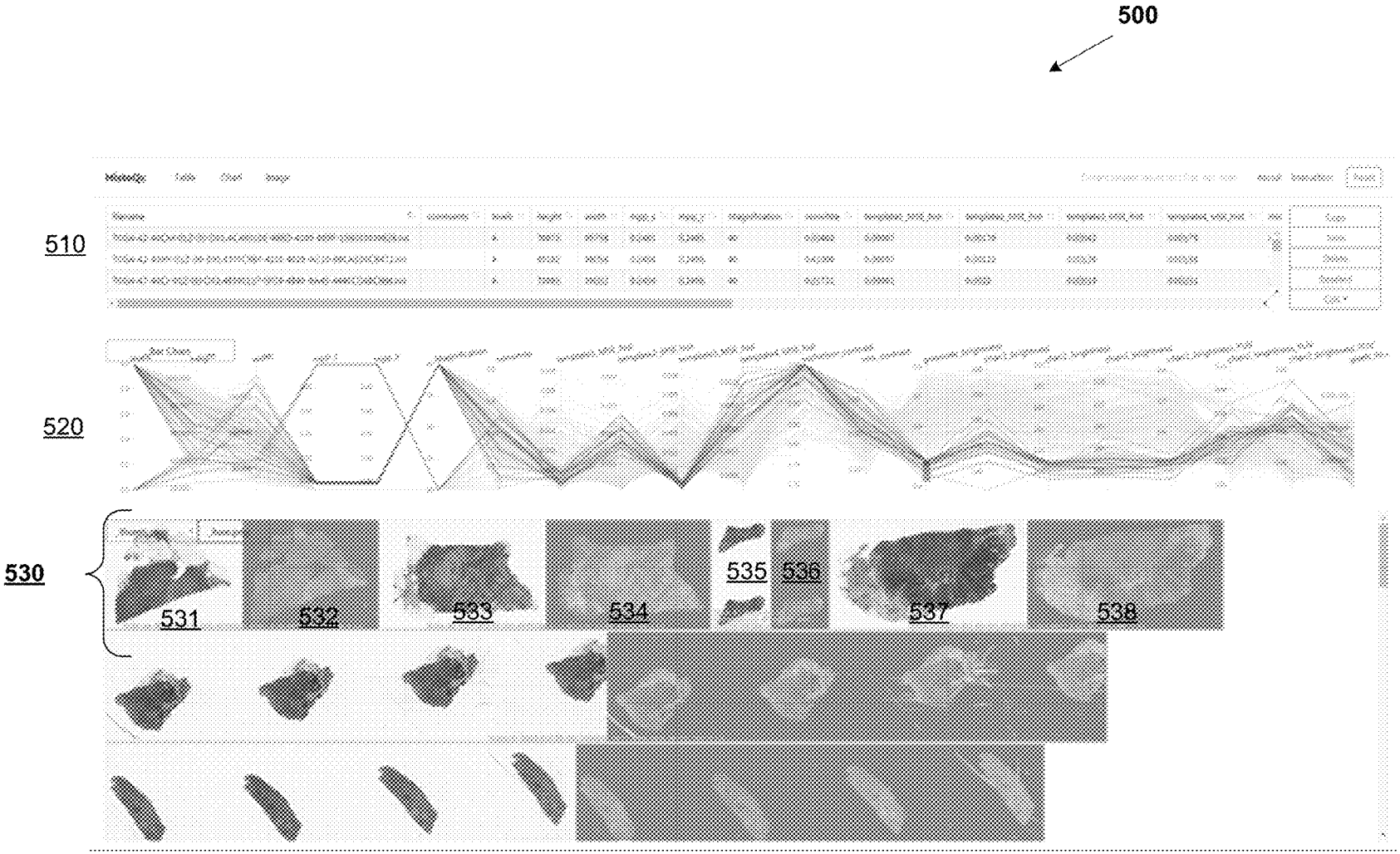
FIG. 5 illustrates an exemplary user interface (UI) for DP slide quality control.

Embodiments may employ a user interface (UI), including an HTML5 based graphical user interface (GUI) which seamlessly facilitates real-time visualization and filtering of the data (e.g., output images, true masks, metadata, metrics). FIG. 5 illustrates an exemplary UI 500. UI 500 includes a first UI component 510 configured to display a table with sortable columns. UI 500 supports receiving, via the UI 500, a user selection to control a processor to organize a table (e.g., a table as represented in first UI component 510) based on the user selection. UI 500 also includes a second UI component 520 configured to facilitate adding a filter on a parallel coordinate plot axis, which reduces visible samples to those having values falling within a specified range. UI 500 supports receiving, via the UI 500, a user selection to control a processor to add a filter on the parallel coordinate plot axis. UI 500 further includes a third UI component 530 configured to display thumbnail images of DP images (e.g., thumbnails 531, 533, 535, and 537) alongside corresponding HistoQC pipeline overlay output indicating corresponding artifact free regions 532, 534, 536, and 538 respectively. UI 500 supports receiving, via the UI 500, a user selection to select a thumbnail image from among, for example, thumbnails 531, 533, 535, and 537.

Figure 6:
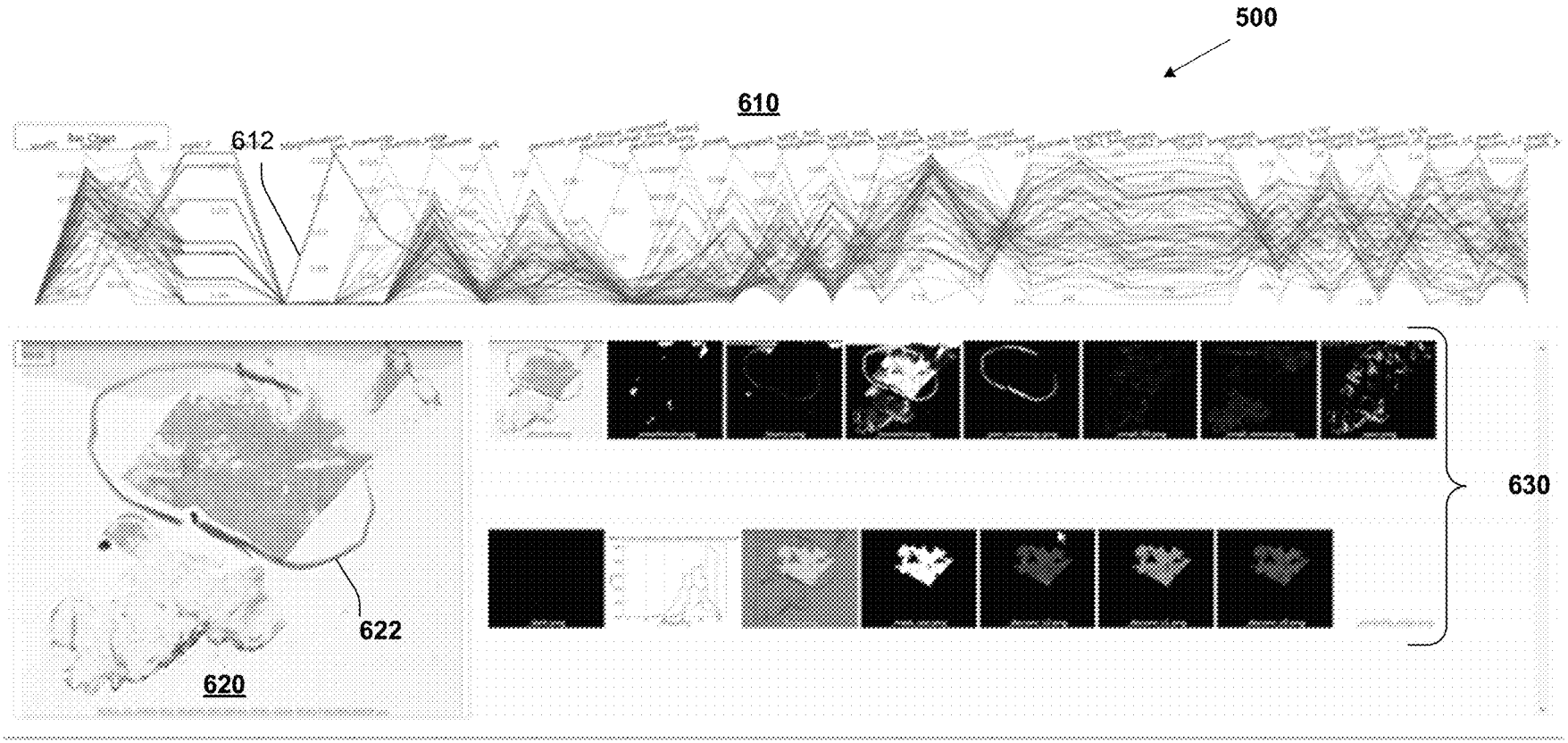
FIG. 6 illustrates an exemplary UI for DP slide quality control.

FIG. 6 illustrates further components of UI 500. FIG. 6 illustrates a selected DP image 620 demonstrating pen markings 622. Selecting a DP image from among, for example, a DP image represented by thumbnail images 531, 533, 535, and 537, results in generating and displaying a parallel coordinate graph 610, with the line 612 associated with selected DP image 620 highlighted in parallel coordinate graph 610. In this example, the UI displays a plurality of outputs 630 (e.g., refined true masks, thresholds) produced by the application of modules from the HistoQC pipeline to the original selected DP image 620, facilitating more detailed subsequent review, either by an automated QC system, or by a human pathologist. Embodiments provide for selecting from among the plurality of outputs 630, including but not limited to double-clicking on a member of the plurality of outputs 630, to access and display a higher resolution version of the selected member of the plurality of outputs. Embodiments thus facilitate identifying those DP slides that might require additional scrutiny faster and more accurately than existing approaches to DP QC.

Embodiments may determine if a DP slide requires additional scrutiny using different approaches. Embodiments may sort DP slides or DP slide data according to various columns to express outliers with unexpectedly high or low values as illustrated in FIG. 5, first UI component 510. Embodiments may generate or analyze interactive parallel coordinate plots of extracted metrics to represent potential batch effects and outliers, as illustrated in FIG. 5, second UI component 520. Embodiments may also display or compare the original, pre-application of the QC pipeline, DP slides juxtaposed with various output masks generated by embodiments, as illustrated in FIG. 5, third component 530. Embodiments may include a UI that facilitates receiving, via the UI, a user selection (e.g., by clicking or otherwise selecting) a row or image to display the various masks produced by the application of the HistoQC pipeline, as illustrated in FIG. 6, elements 610, 620, 630, with a subsequent click (or other selection approach) taking the user to a higher magnification version of the mask of interest for more detailed review. Embodiments thus provide improved user experience and efficiency compared to existing DP QC approaches. In embodiments described herein, upon the user either annotating rows using a comments field or removing rows from a table, the resulting table may be saved and used as a list of samples suitable for downstream computation. In another embodiment, DP images may be annotated or selected automatically as suitable for downstream computation. Embodiments, once installed on a local system or apparatus (e.g., computer, laptop computer, tablet computer, smartphone, local area network storage) do not require an internet connection to perform DP QC, thus making embodiments suitable for performing QC on non-anonymized clinical data, since the non-anonymized clinical data will not have to travel over unsecured internet channels for embodiments to analyze it.

Embodiments provide improved, faster DP QC compared to existing DP QC approaches. For example, embodiments identified regions of artifact free tissue on a total of n=450 40× magnification, randomly selected slides from the TCGA breast cancer (BRCA) cohort. Analysis of this dataset performed by embodiments using a single processor took 130 minutes using a 4 hyperthreaded core processor. Embodiments using multiple processors in parallel may analyze a similar data set in less than one minute. Analysis of the same dataset using existing approaches, where manual analysis of a DP slide takes at least one minute, would take at least 450 minutes.

Figure 7:
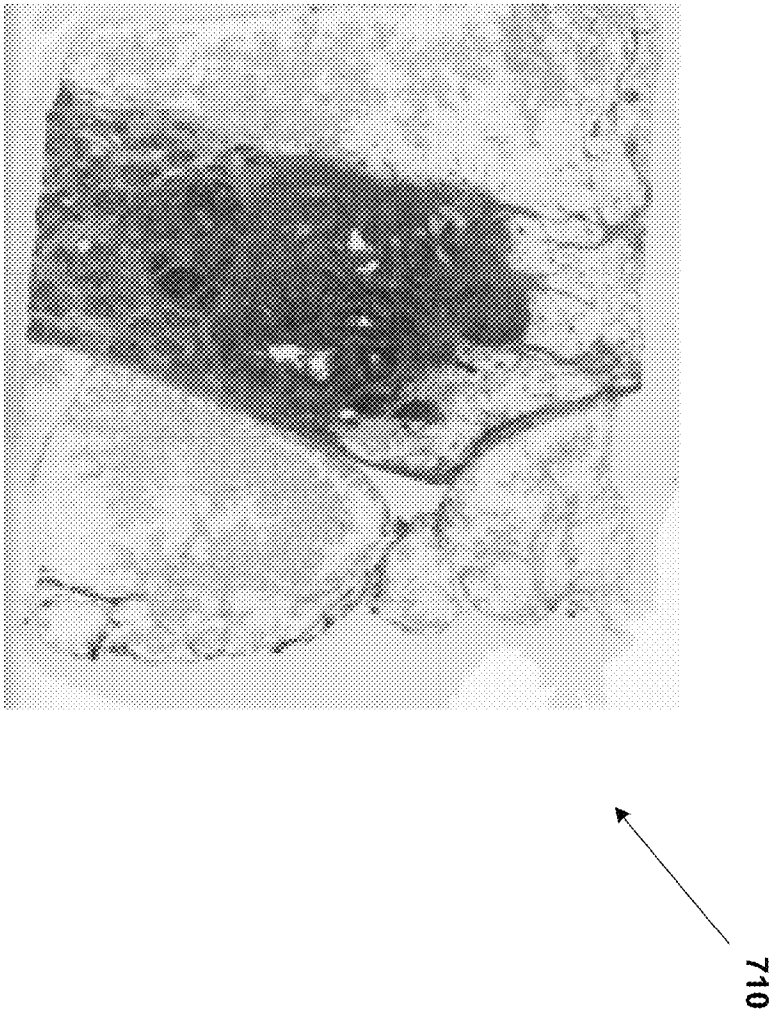
FIG. 7 illustrates a DP slide exhibiting an artifact.

Representative slides in the TCGA BRCA cohort identified by embodiments as containing artifacts such as air bubbles and slide cracks include DP slide 710 illustrated in FIG. 7, which demonstrates an air bubble artifact. FIG. 1 illustrates a DP slide 100 that demonstrates a region of blurry tissue 110. Embodiments identified artifact free regions 130, and generated mask 120. Embodiments successfully identified regions with folded tissue 212 in FIG. 2, as well as pen markings 312 illustrated in FIG. 3, removing the artifacts from the generated masks 220 and 320 respectively. Derived from output generated by embodiments, FIG. 4 illustrates potential batch effect presence in MPP in histogram 410, and heterogeneity in tissue brightness for the TCGA-BRCA dataset in histogram 420. Embodiments thus facilitate improved artifact detection, batch effect detection, and improved selection of images for downstream experimental design.

In one example, results generated by embodiments were confirmed by two expert human pathologists with experience in digital pathology, who assigned a value of either "acceptable" or "not-acceptable" to each of the masks produced by embodiments. Acceptability was defined by at least an 85% area overlap between the pathologists' visual assessment, and embodiments' computational assessment, of artifact free tissue. Each pathologist independently reviewed n=250 samples. Additionally, a total of n=50 images from the TCGA were evaluated by both pathologists and embodiments to determine inter-expert agreement on embodiments' output. Overall, the agreement between embodiments and the expert pathologists was 94% (235 out of 250) for Expert 1 and 97% (242 out of 250) for Expert 2. For the n=50 slides evaluated by both experts, inter-observer agreement was 96% (48 out of 50), comparable to that of embodiments with the individual readers.

One example embodiment is now described in detail. In this embodiment, a histological quality control (HistoQC) pipeline is accessed. The HistoQC pipeline includes a set of modules. The set of modules may include a module that extracts metadata from a DP image, a module that generates metrics based on data extracted from the DP image, or a module that classifies the DP image, or a region of the DP image, including modules that classify the DP image or region of the DP image using machine learning techniques. The HistoQC pipeline defines an order in which the set of modules are applied or executed. The set of modules act on the DP image to produce metrics and to produce output images. The set of modules may have a computational cost (e.g., time, processor cycles, memory).

In this example, upon accessing or loading a DP image, embodiments assign a "True mask" to the DP image, indicating that every pixel in the DP image is artifact free and useful for computational analysis. In one embodiment, this mask is referred to as "img_mask_use", although one of ordinary skill will appreciate that other names or naming conventions may be applied. Embodiments apply or execute modules sequentially, as defined by the HistoQC pipeline. Embodiments may apply or execute modules to sequentially refine the "img_mask_use" mask. For example, while initially, before analysis, the entire image is considered useful for diagnostic purposes or downstream computation, or presentation differences, including being free of artifacts or batch effects, after application of a first module that refines the mask based on intensity, the background (i.e., non-tissue region) of the image is set to false, refining the locations in the image which are suitable for further analysis by modules, further computation, or downstream computation.

In this example, embodiments may define an order in which members of the set of modules defined by the HistoQC pipeline are applied to the DP image. The order of events defined by the HistoQC pipeline affects the regions considered for further computation. For example, a module may have an option to "limit_to_mask", which indicates that the module's operations will only take place on regions in the DP image currently identified as acceptable by "img_mask_use". For example, when computing DP image color distributions, a user may require that modules only be applied on the part of the image that includes tissue, and that modules avoid the white background which would artificially inflate the white value of the distribution. Thus, in this example, a "getHistogram" module may be placed after a "getIntensityThresholdPercent" module, according to the particular HistoQC pipeline.

In this example, embodiments may be employed to select a set of DP images from a plurality of DP images (i.e., from a cohort) for analysis or downstream computation (e.g., for training a machine learning classifier). One example workflow includes applying a first HistoQC pipeline to the plurality of images. The first HistoQC pipeline may be a low-computational cost HistoQC pipeline. The first HistoQC pipeline discovers DP images among the plurality of DP images that were scanned at different magnifications (e.g., 20×, 40×). The first HistoQC pipeline also performs tissue detection (e.g., white thresholding, to distinguish tissue from white background). For example, embodiments may distinguish tissue that is useful for further analysis from tissue that is not useful for further analysis, e.g., adipose tissue that may not be relevant for diagnostic applications. In this example, the first HistoQC pipeline may thus distinguish tissue from the background of the image, and further distinguish adipose tissue not useful for further analysis from non-background tissue, and generate a true mask indicating this tissue for subsequent iterations. The first HistoQC pipeline further computes histograms and differences from target templates.

In this example, embodiments split the plurality of DP images into sub-cohorts based on the application of the first HistoQC pipeline. Since different modules may function differently at different magnifications, the plurality of DP images may be divided into a first magnification cohort (e.g., 20×), and a second magnification cohort (e.g., 40×). Embodiments may define cohorts further based on the number of internal storage format levels (i.e., "levels"), or image properties, including lightness, stain intensity, or other image properties, of the DP image. Cohorts may be defined on other, different properties of the members of the plurality of DP images. Thus embodiments improve on existing approaches that may suffer from performance degradation or crashes when the image level which is loaded is too different, which may result in memory issues (e.g., loading too large an image for existing resources), or attempting to open an image level that does not exist for the particular DP image. Embodiments may divide the plurality of DP images into sub-cohorts automatically, or may provide a user interface for dividing the plurality of DP images into sub-cohorts. For example, embodiments may display a parallel coordinates graph, upon which clicking and dragging on any axis facilitates the generation of filters to generate and save subsets of DP images, or the removal of images.

In this example, embodiments, upon the generation of sub-cohorts (e.g., a first, 20× sub-cohort, and a second, 40× sub-cohort), may run a second, different HistoQC pipeline on the first sub-cohort, or a third, different HistoQC pipeline on the second sub-cohort. For example, a more computationally expensive second, different HistoQC pipeline tailored to 20× magnification DP images may be applied to the first sub-cohort, since the first sub-cohort is smaller than the initial plurality of DP images, thus reducing the computational burden to systems implementing embodiments, compared to running the computationally more expensive HistoQC pipeline on all of the initial plurality of DP images. Additionally, the second, different HistoQC pipeline may be tailored to detect artifacts more likely to occur in the first sub-cohort, and the third, different HistoQC pipeline may be tailored to detect artifacts more likely to occur in the second sub-cohort. Embodiments may identify presentation differences, including batch effects or artifacts in DP images, or select images suitable for downstream computation, at any of the iterations of applications of HistoQC pipelines, including each application (e.g., the first application of the low-cost HistoQC pipeline to the initial plurality of DP images, and the subsequent application of higher-cost HistoQC pipelines to sub-cohorts) or fewer than each application. For example, the application of the first, low-computational cost pipeline may detect tissue, magnification levels, and other properties of the members of the plurality of DP images, and then assign the members of the plurality of DP images to different cohorts, and the other, higher-computational cost HistoQC pipeline may perform other modules on the DP images in the different cohorts, ultimately selecting images suitable for downstream computation. In this example, the first, low-computation cost pipeline may also detect gross defects in a DP image, including gross defects that require fewer computational resources to detect than more subtle defects, and reject a DP image with a gross defect from further downstream computation or diagnostic use, without providing the DP image to the higher-computational cost HistoQC pipeline.

A module may have settings or parameters. Embodiments may employ a module multiple times with different settings or parameters. For example, a module "getIntensityThresholdPercent" may apply a threshold to a DP image. In this example, "getIntensityThresholdPercent:tissue" applies a higher threshold to remove the background of the slide, while "getIntensityThresholdPercent:darkTissue" applies a lower threshold to identify regions in the DP image that contain artifacts, including folded tissue or overstaining. A HistoQC pipeline may employ a module multiple times with different settings or parameters, or different HistoQC pipelines (e.g., a first, low-cost HistoQC pipeline, and a second, different, higher-cost HistoQC pipeline) may employ a module multiple times with different settings or parameters. A HistoQC pipeline may define values for parameters associated with a module.

A DP image may have a size. Embodiments may apply a HistoQC pipeline to DP images having different sizes. Embodiments may define a parameter (e.g., image_work_size) that specifies a default size of the internal representation of the DP image to be used in the HistoQC pipeline. A module may perform operations upon a DP image in which image size may have a performance or accuracy impact. A module in the HistoQC pipeline may use an image of the specified default size to perform operations, unless otherwise specified. For example, it may be infeasible to load an entire 40× whole slide mount, or loading the entire 40× slide mount may offer no greater specificity or accuracy for a particular metric or classification module than loading less than the entire 40× slide mount. Thus, embodiments may define a default "image_work_size" of, for example, 1.25×, which specifies examining the DP image at a magnification of 1.25×.

Embodiments may process the DP image according to the desired image size according to different approaches. An "image_work_size"<1 and which is a floating point number, indicates that the original DP image is downscaled. If "image_work_size"<100, it is considered by embodiments to indicate the level of image to load. For example, in the case of the proprietary Aperio SVS whole slide image file format, this may coincide with {0=Base, 1=4:1, 2=16:1, 3=32:1, etc. . . . }. If "image_work_size">100, it is considered by embodiments to be the exact longest dimension desired (e.g., an image size of 1234 pixels by 1234 pixels, if "image_work_size" is set to 500, the output will be 263×500 pixels). This may cause different magnifications per image, if the images are of different sizes.

If "image_work_size"=1.25×, embodiments consider this to be the desired apparent magnification. In this situation, processing the DP image is simplified since each DP image will be made to have the same apparent magnification, regardless of its base magnification. Embodiments may consider time to load and downsample DP images to 1.25×, or whether downstream computations require or can accommodate this kind of heterogeneity. Embodiments may, in this case, split a member of the plurality of DP images into smaller images according to the base magnification and base number of levels, sequentially loading smaller tiles, resizing the tiles, and then merging the tiles together, thus drastically reducing memory overhead compared to existing approaches. For example, a 100,000 pixel by 100,000 pixel DP slide at 40× magnification requires approximately 30 GB in memory, which is too large for most machines employed in existing DP QC to handle. Embodiments may instead look at 100 $k^2$ images of size 1 k×1 k, which can easily fit into memory, and either perform computations on those images or use them to downsample to a desired magnification which is not natively available in the image file format. For example, where a system saves images at 40×, and 10× but not 20×, embodiments may make a synthetic 20× image by taking the 40× image in a piece wise fashion, down sampling it by ½ to 20×, and then merging all the pieces together. While specific "image_work_size" values are described, other, different values of "image_work_size" may be employed.

Embodiments may employ modules that generate metrics based on statistics or thresholds derived from the DP image. Metrics, including pixel-level metrics, may be reported as absolute values, as values relative to mask size (i.e., the true mask), or as relative to a previous mask area. Thus, embodiments may generate metrics iteratively.

Embodiments may also employ modules that classify the DP image or a region of the DP image using a machine learning approach. Embodiments may further train a machine learning classifier. For example, a module may be configured to detect pen markings on the DP image. In this example, embodiments may train a pen classification module. Training the pen classification module may include loading exemplar images from which to create a model. An exemplar includes two images of the same size, the first image being the original image and the second image being a binary mask. The second, binary mask image contains only binary values (i.e., {0, 1}), and identifies which pixels should be used as the positive class (e.g., 1) and which pixels should be used as the negative class (e.g., 0). In a preferred embodiment, the exemplar images are of the same magnification as the magnification specified by "image_work_size", since this will improve the performance of the classifier module.

In this example, training the machine learning classifier further includes training the machine learning classifier after the exemplar images are loaded. In one embodiment, to improve the robustness of the machine learning classifier, pixel-level features are computed to augment the original RGB space of the DP image. Upon training the machine learning classifier, a single model may be shared by multiple threads which request access to the classifier, further reducing memory and training requirements of embodiments compared to existing approaches. After the model is trained, it may be stored in memory, and applied at the appropriate time (e.g., when the classifier module is applied by the particular HistoQC pipeline) to a DP image. The machine learning classifier may generate as an output a probability that a particular pixel, or plurality of pixels, belongs to the trained positive class. In one embodiment, a threshold is applied to the probability map to refine the true mask and provide a final binary value mask for use in downstream analysis.

A HistoQC pipeline may specify various modules to employ, the order of application of the modules, and parameters associated with the modules. Embodiments may include a Morphology module. The Morphology module may be configured to perform a removeSmallObjects operation. The removeSmallObjects operation removes small items from the DP image. For example, the removeSmallObjects operation may reduce small pixel noise, dust, or other small object artifacts. The removeSmallObjects operation may also define a boundary around a small object. The Morphology module may also be configured to perform a fillSmallHoles operation. The fillSmallHoles operation may, for example, fill in small or medium sized "holes" in images. In one embodiment, the fillSmallHoles operation fills holes of less than 1000 pixels at the "image_work_size" magnification. In another embodiment, other sized holes may be filled (e.g., 250 pixels, 500 pixels, 1250 pixels). For example, lumen spaces in tubules often are detected as background and removed from the final mask, and the Morphology module will fill the lumen spaces in.

Embodiments may include a LightDark module. The LightDark module may be configured to perform a getIntensityThresholdOtsu operation. The getIntensityThresholdOtsu operation thresholds the image based on a dynamic Otsu threshold. The LightDark module may be further configured to perform a getIntensityThresholdPercent operation. The getIntensityThresholdPercent operation thresholds the image based on user supplied values, or based on default values. The getIntensityThresholdPercent operation detects where the tissue is on the slide (e.g., non-white regions) and where folded tissue may be (e.g., very dark regions).

Embodiments may also include a Histogram module configured to perform a getHistogram operation. The getHistogram operation generates a histogram of the image in RGB space. The Histogram module may be further configured to perform a compareToTemplates operation. The compareToTemplates operation compares the image's histogram to template images. Template images may be provided by the user, acquired from a library of template images, or otherwise accessed by embodiments. Embodiments may display a histogram, or comparison of a generated histogram to a template image.

Embodiments may also include a Deconvolution module configured to perform a seperateStains operation. The seperateStains operation performs stain deconvolution. Stain deconvolution includes separating features according to their colors. For example, immunohistochemical (IHC) staining may be separated from the hematoxylin counterstaining in a hematoxylin and eosin (H&E) stained DP image. In one embodiment, the separateStains operation uses a stain deconvolution implementation approach that employs built in matrices. In another embodiment, other stain deconvolution techniques may be employed.

Embodiments may also include a Classification module configured to perform a pixelWise operation. The pixelWise operation applies an RGB based classifier to the DP image, where the pixelWise operation's values come from a user inputted TSV. In another embodiment, the pixelWise operation's values come from a default TSV. The Classification module may be further configured to perform a byExampleWithFeatures operation. The byExampleWithFeatures operation computes features of template images which have associated binary masks indicating positive and negative classes. A trained classifier is then used on DP images. The byExampleWithFeatures operation may be employed for pen detection (i.e., with texture), crack detection, or other classifications.

Embodiments may also include a BubbleRegionByRegion module configured to perform a roiWise operation. The roiWise operation detects contours of lines of air bubbles on a DP slide. The roiWise operation may contain an exemplar of how to use embodiments to iteratively loop over very large images at high magnifications.

Embodiments may also include a BrightContrast module configured to perform a getBrightnessGray operation. The getBrightnessGray operation computes the average value of the DP image in gray color space, which ultimately represents how bright the DP image is perceived. The BrightContrast module may also be configured to perform a getBrightnessByChannelinColorSpace operation. The getBrightnessByChannelinColorSpace operation computes a triplet (one per color channel) in the desired color space. The getBrightnessByChannelinColorSpace operation may be employed for detecting outliers. The BrightContrast module may be further configured to perform a getContrast operation. The getContrast operation computes both RMS and Michelson contrast metrics from the DP image.

Embodiments may also include a PenMarking module configured to perform an identifyPenMarking operation. The identifyPenMarking operation identities pen markings on a pixel by pixel basis by, in one embodiment, using a tsv file of color values. This is suitable when the marking is very different from the staining (e.g., green/blue marker on pink tissue). In one embodiment, the tsv file of color values may be user supplied, or may be a default tsv file. The PenMarking module may employ machine learning techniques.

Embodiments may also include a BlurDetection module configured to perform a identifyBlurryRegions operation. The identifyBlurryRegions operation uses a Laplace matrix to determine which regions in the DP image are likely blurry. In another embodiment, other blur detection techniques may be employed.

Embodiments may also include a Basic module configured to perform a getBasicStats operation. The getBasicStats operation pulls out metadata about the DP image from the DP image's image header. In another embodiment, metadata about the DP image may be acquired from a different location (e.g., database). The Basic module may also be configured to perform a getMag operation. The getMag operation extracts base magnification from the DP image. In one embodiment, the getMap operation predicts magnification using machine learning and a set of reference images at target magnifications. The Basic module may also be configured to perform a finalComputations operation. The finalComputations operation computes the final number of pixels available in the output image. The finalComputations operation may determine if the final number of pixels exceeds a threshold value, or does not meet a threshold value. Too high or low of a number may indicate incorrect processing or image outliers. For example, in certain situations, if less than 5% of the total pixels in an image are identified as suitable for computation it is likely the overall image should be considered suspect. Similarly, high values are also questionable, such as the case when greater than 90% of an image is marked as acceptable, which may indicate severe fixation or staining issues. Other threshold levels may be employed. The Basic module may also be configured to perform a finalProcessingSpur operation. The finalProcessingSpur operation removes spurious morphology from the final mask. For example, small "arms" of tissue may be rounded off and removed. In one embodiment, tissue arms may be determined using a morphological binary opening operation, which includes an erosion operation followed by a dilation operation. In one embodiment, a disk filter of radius five is employed, while in another embodiment, other radii may be employed. The Basic module may also be configured to perform a finalProcessingArea operation. The finalProcessingArea operation removes larger islands from the output mask, including, for example, isolated pieces of tissue. In one embodiment, the finalProcessingArea operation removes islands of tissue having an area less than a threshold area. In one embodiment, the threshold area is 10,000 pixels, while in another embodiment, another, different threshold area (e.g., 5000 pixels, 20,000 pixels) may be employed.

Embodiments may also include a Save module configured to perform a saveFinalMask operation. The saveFinalMask operation saves both the output mask generated by the application of modules in the HistoQC pipeline, and also the overlay on the original DP image. The Save module may be further configured to perform a saveThumbnails operation. The saveThumbnails operation saves a thumbnail image for easier viewing. Saving thumbnail images facilitates more efficient display of DP images and operation of a user interface when reviewing DP images analyzed by embodiments described herein.

In other embodiments, other modules, or other parameters associated with a module, may be employed.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, circuit, processor, or similar electronic device that manipulates and transforms data represented as physical (electronic) quantities.

Example methods and operations may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 8:
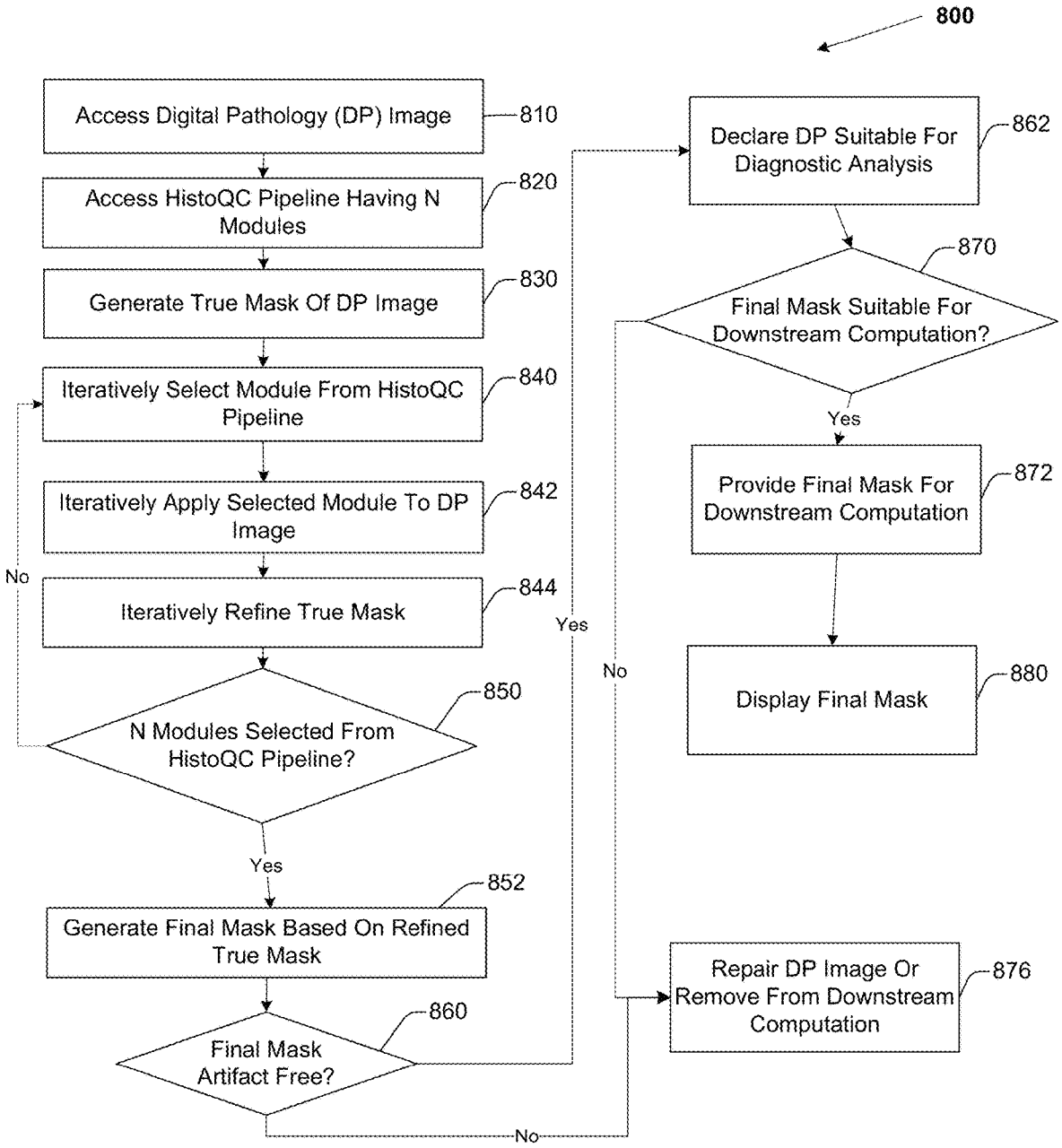
FIG. 8 is a flow diagram of example operations for DP QC.

FIG. 8 is a flow diagram of example operations 800 that may be performed by a processor for performing quality control (QC) operations on a digital pathology (DP) image. A processor(s) may include any combination of general-purpose processors and dedicated processors (e.g., graphics processors, application processors, etc.). The processors may be coupled with or may include memory or storage and may be configured to execute instructions stored in the memory or storage to enable various apparatus, applications, or operating systems to perform the operations. The memory or storage devices may include main memory, disk storage, or any suitable combination thereof. The memory or storage devices may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The set of operations 800 includes, at 810, accessing a DP image. Accessing the DP image includes acquiring electronic data, reading from a computer file, receiving a computer file, reading from a computer memory, or other computerized activity. In one embodiment, the DP image is a digitized image of an H&E stained pathology slide magnified at 40× magnification or 20× magnification. In another embodiment, the DP image has other, different imaging parameters. The DP image may include metadata about the DP image. The metadata or a portion of the metadata may be stored in an image header, or may be stored in a logically different location, for example, in a database, file, or other data structure. In one embodiment, the metadata includes a magnification level, a scanner type, or a microns per pixel value. In another embodiment, the metadata may include other, different metadata. While H&E stained images are described in this example, DP images having other stain types, including immunofluorescence staining, may be employed.

The set of operations 800 also includes, at 820, accessing a histological quality control (HistoQC) pipeline. The HistoQC pipeline includes a sequential list of N modules, N being an integer. A module is configured to perform an operation (i.e., execute the module) on the DP image. In one embodiment, the HistoQC pipeline configuration, including the sequential list of N modules, is specified using a configuration file. Accessing the HistoQC pipeline in this embodiment may include accessing the configuration file. The configuration file may be a default configuration file, or may be user defined. The configuration file may have sections, where a section is named for an associated module, and where a section has a key-value parameter. The configuration file may have a single section called "pipeline". In one embodiment, the "pipeline" section defines, in sequential order, the steps (e.g., modules) that will be performed or applied to a DP image. Accessing the HistoQC pipeline includes acquiring electronic data, reading from a computer file, receiving a computer file, reading from a computer memory, or other computerized activity.

The set of operations 800 also includes, at 830, generating a true mask of the DP image. In one embodiment, the true mask indicates which pixels in the DP image are artifact free. In another embodiment, the true mask indicates which pixels in the DP image a free of presentation differences, including artifacts or batch effects. The true mask may indicate which pixels in the DP image are suitable for clinical purposes, or suitable for downstream computation. In one embodiment, generating the true mask includes defining a true mask that indicates that all the pixels in the DP image are artifact free, free of batch effects, or free of presentation differences, including artifacts or batch effects.

For example, in one embodiment, before an initial application of the HistoQC pipeline to the DP image (e.g., before the first module in the HistoQC pipeline is applied to the DP image), a true mask may be generated that indicates that all the pixels in the DP image are artifact free and thus suitable for diagnostic analysis or downstream computation. Embodiments iteratively refine the true mask through the sequential application of modules as defined by the HistoQC pipeline. While in this embodiment, a true mask of the image is generated at 830, it is to be appreciated that in another embodiment, the DP image may be accessed already having an initial true mask defined. In still another embodiment, step 830 may be skipped, and a true mask may be first defined according to the application of a module defined by the HistoQC pipeline.

The set of operations 800 also includes, at 840, proceeding, starting with the first module in the HistoQC pipeline, to, in an iterative manner, select a module from the HistoQC pipeline. Selecting the module from the pipeline may include selecting a module according to the order with which modules are listed in the HistoQC pipeline, the sequential list of N modules, or the configuration file. For example, a configuration file may list modules in order of desired application. In another embodiment, a database, a list, or other data structure may indicate the order with which to select a module. Selecting a module includes acquiring electronic data, reading from a computer file, receiving a computer file, reading from a computer memory, or other computerized activity.

The set of operations 800 also includes, at 842, applying the selected module to the DP image. Applying the selected module to the DP image includes, for at least one selected module, generating a refined true mask by, at 844, refining the true mask based on the application of the module to the DP image, with the refined true mask acting as a true mask for a next iteration, until N modules have been selected from the HistoQC pipeline. Applying the module to the DP image includes, for the at least one selected module, refining the true mask according to the output of the module, thus generating a refined true mask. In one embodiment, in a situation where a true mask has not been defined at step 830, embodiments may define a true mask at 842. Applying the module to the DP image includes acquiring electronic data, reading from a computer file, receiving a computer file, reading from a computer memory, or other computerized activity.

Embodiments may apply modules to the DP image that generate metrics about the DP image or the true mask, that threshold the DP image or the true mask, or that classify the DP image, the true mask, or a region of the DP image or true mask using a machine learning approach. In one embodiment, applying the module to the DP image includes extracting a pixel-level feature from the DP image; and generating a metric about the DP image based on the extracted feature. In one embodiment, applying the module to the DP image further includes refining the true mask based on the metric. In another embodiment, features may be extracted according to a window-level approach (e.g., extracting features from a 5 pixel by 5 pixel window) across the DP image or portion of the DP image.

In one embodiment, applying the module to the DP image includes computing a threshold based on the true mask. The threshold may be based on pixel-level values, including intensity values. In one embodiment, applying the module to the DP image further includes refining the true mask based on the threshold.

In one embodiment, applying the module to the DP image includes providing the true mask to a machine learning classifier. In this embodiment, applying the module to the DP image also includes receiving, from the machine learning classifier, a classification of a region of the true mask, where the machine learning classifier generates the classification based, at least in part, on a pixel-level analysis of the true mask. In one embodiment, applying the module to the DP image further includes refining the true mask based on the classification received from the machine learning classifier.

In one embodiment, the operations 800 further include training the machine learning classifier according to a set of exemplar images. A member of the set of exemplar images has a plurality of pixels, a pixel having an intensity. The first member of the set of exemplar images is an original image (e.g., a DP image) and the second member of the set of exemplar images is a binary mask of the original image. The binary mask identifies which pixels in the second member are members of a positive class, and which pixels in the second member are members of a negative class. In one embodiment, the first member of the set of exemplar images and second member of the set of exemplar images have the same magnification. Embodiments may train the machine learning classifier before the application of the HistoQC pipeline, for example upon accessing the HistoQC pipeline at 820, upon selecting a module that includes a machine learning classification operation, or at other points during the implementation of operations 800.

The set of operations 800 also includes, at 850, upon determining that N modules have been selected from the HistoQC pipeline, generating, at 852, a final mask based on the refined true mask. In this embodiment, the final mask indicates a region of the DP image that is artifact free. The final mask is generated based, at least in part, on the refined true mask. The final mask may further indicate which regions of the DP image are suitable for downstream computation. The final mask may indicate which regions of the DP image free, to a threshold degree, of presentation differences, including artifacts or batch effects.

The set of operations 800 also includes, at 860, upon determining that a threshold level of the DP image is artifact free based on the final mask, declaring, at 862, the DP image suitable for diagnostic analysis. Declaring the DP image suitable for diagnostic analysis may including setting a variable or a flag to a value indicating the DP image is suitable (e.g., 1 indicates suitable, 0 indicates unsuitable). Declaring the DP image suitable for diagnostic analysis includes acquiring electronic data, reading from a computer file, receiving a computer file, reading from a computer memory, or other computerized activity.

The set of operations 800 also includes, at 870, upon determining that the final mask is suitable for downstream computation, providing, at 872 the DP image or the final mask for downstream computation. In one embodiment, determining that the final mask is suitable for downstream computation includes determining if the final mask includes a threshold level of artifacts, or if the final mask includes a threshold number of pixels relative to the number of pixels in the DP image. For example, in one embodiment, determining that the final mask is suitable for downstream computation includes determining that at least 30% of the pixels in the DP image are artifact free. In another embodiment, other threshold numbers of pixels (e.g., 20%, 50%) may be employed. For example, a first diagnostic procedure may require that at least 50% of the pixels be artifact free, while a second, different diagnostic procedure may require that at least 20% of the pixels be artifact free. In one embodiment, providing the final mask for downstream computation includes including the final mask in a cohort of DP images suitable for downstream computation. Providing the final mask or the DP image for downstream computation includes acquiring electronic data, reading from a computer file, receiving a computer file, reading from a computer memory, or other computerized activity.

The set of operations 800 also includes, upon determining that the final mask is not suitable for downstream computation, repairing, at 876 the DP image. The set of operations 800 may also include, at 876, removing the DP image from downstream computation. In one embodiment, repairing the DP image may include normalizing the DP image, filling in holes identified by a module, or other action.

The set of operations 800 further includes, at 880, displaying the final mask. Embodiments may also display the DP image, the true mask or iterations of the true mask as the true mask is refined, metrics, thresholds, classifications, thumbnails, or other variables or values generated by modules applied to the DP image. Displaying the final mask may include displaying the final mask on a computer monitor, a smartphone display, a tablet display, or other displays. Displaying the final mask may also include printing the final mask. Displaying the final mask, the DP image, the true mask or iterations of the true mask as the true mask is refined, metrics, thresholds, classifications, thumbnails, or other variables or values generated by modules applied to the DP image may include displaying the final mask, the DP image, the true mask or iterations of the true mask as the true mask is refined, metrics, thresholds, classifications, thumbnails, or other variables or values generated by modules applied to the DP image using a UI as described herein, including UI 500. Displaying the final mask may also include controlling digital pathology quality control system, a monitor, or other display, to display operating parameters or characteristics of a machine learning classifier, during both training and testing, or during clinical operation of the machine learning classifier. By displaying the final mask, example embodiments provide a timely and intuitive way for a human pathologist to more accurately classify DP images as suitable for downstream computation, or suitable for diagnostic use, thus improving on existing approaches to histology quality control that rely on subjective, qualitative approaches.

Embodiments may also determine if a DP image or a plurality of DP images includes a batch effect. A batch effect is a non-biological technical artifact within a DP image or a threshold percentage of the members of a subset of the plurality of DP images. In one embodiment, where the DP image is a member of a plurality of DP images, the set of operations 800 may further include identifying a batch effect in a subset of the plurality of DP images based, at least in part, on the final mask. The set of operations 800 may also include, upon determining that the batch effect is above a threshold level: correcting the batch effect, or removing the DP image from downstream computation.

In embodiments described herein, classifying the DP image or the true mask using a machine learning module, includes providing the DP image or the true mask to a machine learning classifier. In one embodiment, the machine learning classifier is configured to detect pen markings on a DP slide. The machine learning classifier may be a quadratic discriminant analysis (QDA) classifier, a linear discriminant analysis (LDA) classifier, a support vector machine (SVM) classifier, or may include a convolutional neural network or other deep-learning classifier.

In one embodiment, the operations may further include training the machine learning classifier. In this embodiment, the machine learning classifier is trained and tested using a training set of images and a testing set of images (e.g., exemplars). Training the machine learning classifier may include training the machine learning classifier until a threshold level of accuracy is achieved, until a threshold time has been spent training the machine learning classifier, until a threshold amount of computational resources have been expended training the machine learning classifier, or until a user terminates training. Other training termination conditions may be employed. Training the machine learning classifier may also include determining which features extracted from a DP image or true mask most discriminative in distinguishing a positive class from a negative class (e.g., pen marking, non-pen marking).

While FIG. 8 illustrates various actions occurring in serial, it is to be appreciated that various actions illustrated in FIG. 8 could occur substantially in parallel. By way of illustration, a first process could involve accessing a DP image, a second process could involve applying a first module to the DP image, and a third process could involve displaying the DP image. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage device may store computer executable instructions that if executed by a machine (e.g., computer, processor) cause the machine to perform methods or operations described or claimed herein including operations 800, method 1100, or any other methods or operations described herein. While executable instructions associated with the listed methods are described as being stored on a computer-readable storage device, it is to be appreciated that executable instructions associated with other example methods or operations described or claimed herein may also be stored on a computer-readable storage device. In different embodiments the example methods or operations described herein may be triggered in different ways. In one embodiment, a method or operation may be triggered manually by a user. In another example, a method or operation may be triggered automatically.

Improved digital pathology slide quality control may produce the technical effect of improving DP diagnostics, or the training of machine learning classifiers, by increasing the accuracy of and decreasing the time required to determine if a DP image includes significant artifacts, or if a DP image is suitable for downstream computation (e.g., suitable for use in training a machine learning classifier). Treatments and resources, including expensive immunotherapy agents or chemotherapy may be more accurately tailored to patients with a likelihood of benefiting from said treatments and resources, including responding to immunotherapy or chemotherapy, so that more appropriate treatment protocols may be employed, and expensive resources are not wasted, when DP images are more accurately and more quickly assessed for suitability in diagnostic workflows. Controlling a histology QC apparatus based on improved, more accurate analysis of DP images further improves the operation of the system, processor, or apparatus, since the accuracy of the system, processor, or apparatus is increased and unnecessary operations will not be performed. Embodiments described herein, including at least operations 800, apparatus 900, or method 1100, resolve features extracted from digitized pathology imagery at a higher order or higher level than a human can resolve in the human mind or with pencil and paper. For example, batch effects based on slight stain variations, or low levels of hue/contrast/brightness variations that are not perceivable by the human eye may be detected by embodiments. Thresholds and histograms generated by embodiments are not properties of a DP slide that are perceivable by the human eye or computable using pencil and paper. Embodiments thus perform actions, steps, processes, or other actions that are not practically performed in the human mind, at least because they require a processor or circuitry to access digitized images stored in a computer memory and to extract or compute features including batch effects or metrics that are based on the digitized images and not on properties of tissue or the images that are perceivable by the human eye. Embodiments described herein use a combined order of specific rules, elements, operations, or components that render information into a specific format that is then used and applied to create desired results more accurately, more consistently, and with greater reliability than existing approaches, thereby producing the technical effect of improving the performance of the machine, computer, or system with which embodiments are implemented.

Figure 9:
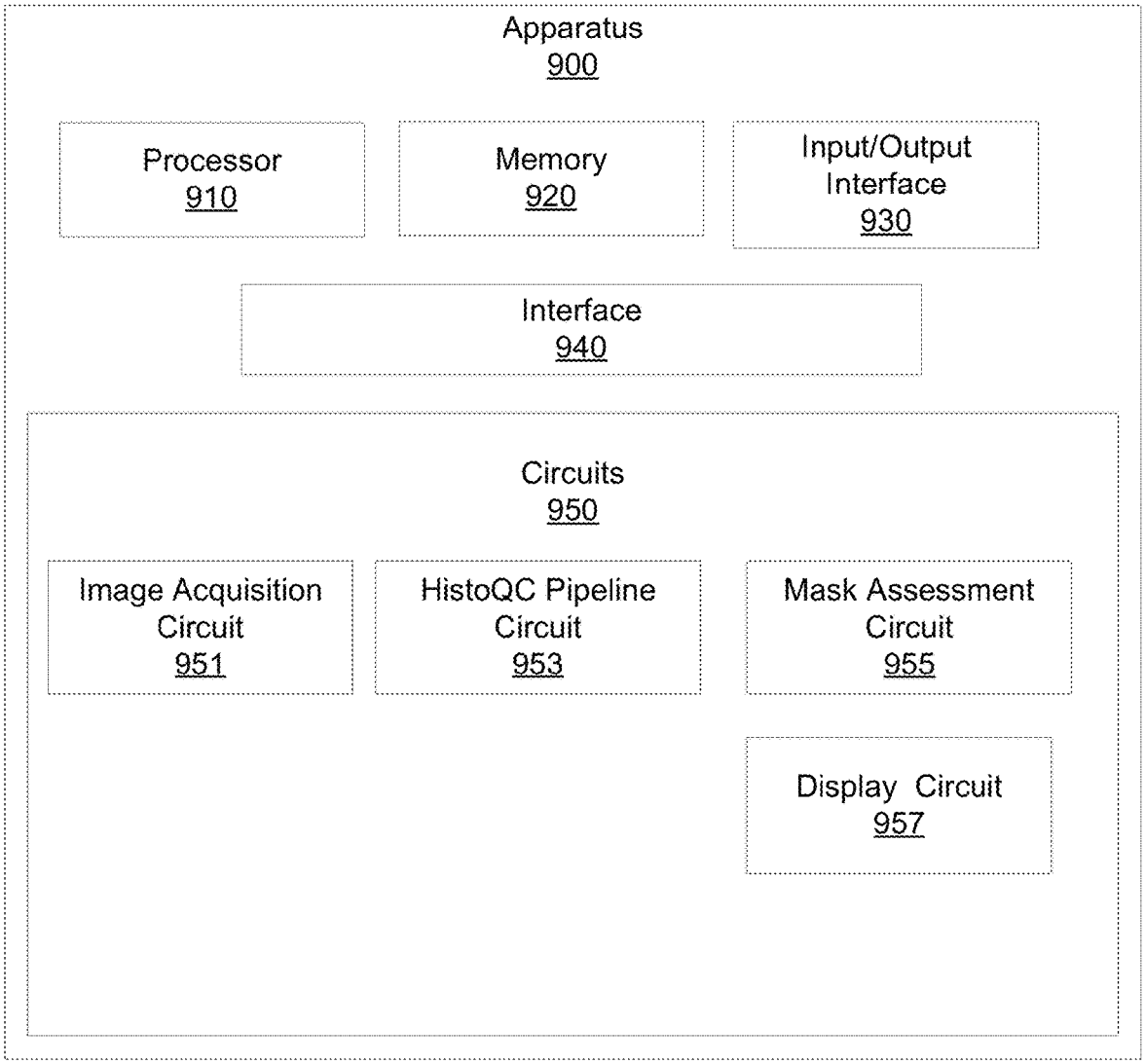
FIG. 9 illustrates an example apparatus for DP QC.

FIG. 9 illustrates an example apparatus 900 for digital pathology quality control. Apparatus 900 includes a processor 910. Apparatus 900 also includes a memory 920. Processor 910 may, in one embodiment, include circuitry such as, but not limited to, one or more single-core or multi-core processors. Processor 910 may include any combination of general-purpose processors and dedicated processors (e.g., graphics processors, application processors, etc.). The processors may be coupled with or may include memory (e.g. memory 920) or storage and may be configured to execute instructions stored in the memory 920 or storage to enable various apparatus, applications, or operating systems to perform the operations. Memory 920 is configured to store a DP image, a true mask, a final mask, a HistoQC pipeline configuration file, or a HistoQC pipeline module. The DP image has a plurality of pixels, a pixel having an intensity. Memory 920 may be further configured to store a training set that includes an original image and a binary mask, or a testing set that includes an original image and binary mask.

Apparatus 900 also includes an input/output (I/O) interface 930, a set of circuits 950, and an interface 940 that connects the processor 910, the memory 920, the I/O interface 930, and the set of circuits 950. I/O interface 930 may be configured to transfer data between memory 920, processor 910, circuits 950, and external devices, for example, a histology QC system or a digital whole slide scanner.

The set of circuits 950 includes an image acquisition circuit 951, a HistoQC pipeline circuit 953, a mask assessment circuit 955, and a display circuit 957. The image acquisition circuit 951 is configured to access a DP image, the DP image having a plurality of pixels, a pixel having an intensity. The DP image includes metadata associated with the DP image. In one embodiment the DP image is an H&E stained DP slide. In another embodiment, other types of staining may be employed. Image acquisition circuit 951 is also configured to define a true mask for the DP image, where the true mask indicates a region of the DP image free of artifacts. In one embodiment, the true mask indicates a region of the DP image free of presentation differences, including artifacts or batch effects. Accessing the DP image may include accessing a DP image stored in memory 920. In one embodiment, accessing the DP image may include accessing a DP image stored in a data storage device, including a hard disk drive, a solid state device, a tape drive, or accessing a DP image over a local area network. Accessing the DP image includes acquiring electronic data, reading from a computer file, receiving a computer file, reading from a computer memory, or other computerized activity.

The HistoQC pipeline circuit 953 is configured to access a first HistoQC pipeline. A HistoQC pipeline has a sequential list of N modules, N being an integer. HistoQC pipeline circuit 953 is also configured to, starting with the first module in the sequential list: select a module from the sequential list; and apply the selected module to the DP image. Applying the selected module to the DP image includes, for at least one selected module: generating a refined true mask by refining the true mask based on the application of the module to the DP image, in an iterative manner, with the refined true mask acting as a true mask for a next iteration, until N modules have been selected from the sequential list. A selected module may, for example, generate a metric about the DP image or the true mask, threshold the DP image or the true mask, or classify the DP image, the true mask, or a region of the DP image or true mask using a machine learning approach.

HistoQC pipeline circuit 953 is configured to, upon determining that N modules have been selected from the sequential list: generate a final mask based on the refined true mask. In one embodiment, the final mask indicates a region of the DP image that is artifact free. In another embodiment, the final mask may indicate a region of the DP image that includes less than a threshold level of artifacts. For example, a first clinical application may require that 90% of the pixels in a DP image be free of artifacts. A second clinical application may require that at least 50% of the DP image be free of a first batch effect. A third clinical application may require that the DP image be free of presentation differences (which may include both artifacts and batch effects) to a threshold level.

In one embodiment, HistoQC pipeline circuit 953 is configured to, upon determining that N modules have been applied from the first HistoQC pipeline, assign the DP image to a cohort. For example, HistoQC pipeline circuit 953 may assign the DP image to a first cohort or a second, different cohort based on a property of the DP image. HistoQC pipeline circuit 953 may, in this embodiment, access a second, different, higher-computational cost HistoQC pipeline, and iteratively apply the modules listed in the second, different, higher-computational cost HistoQC pipeline to the DP image if the DP image is assigned to the first cohort. HistoQC pipeline circuit 953 may, in this embodiment, access a third, different, higher-computational cost HistoQC pipeline, and iteratively apply the modules listed in the third, different, higher-computational cost HistoQC pipeline to the DP image if the DP image is assigned to the second cohort.

Mask assessment circuit 955 is configured to determine if a threshold level of the DP image is artifact free. Mask assessment circuit 955 is configured to, upon determining that a threshold level of the DP image is artifact free based on the final mask: select the DP image for diagnostic analysis.

Mask assessment circuit 955 is also configured to determine if the final mask is suitable for downstream computation. Mask assessment circuit 955 is configured to, upon determining that the final mask is suitable for downstream computation: provide the final mask for downstream computation. In one embodiment, determining that the final mask is suitable for downstream computation may include determining if the DP image is subject to a batch effect, or threshold level of a batch effect. In one embodiment, determining that the final mask is suitable for downstream computation includes determining if the DP image is free, to a threshold level, of presentation differences. A presentation difference may include, for example, an artifact or a batch effect. A presentation difference may also be determined by determining if a metric computed about the DP image (by for example, a module that computes a metric about the DP image), or a region of the DP image, is within a threshold level. In one embodiment, a module may compute, for example, a darkness level metric for the DP image or for a region (e.g., a pixel, a region of pixels), and then mask assessment circuit 955 may determine if the darkness level metric is within a threshold level. For instance, a first downstream computation application may require a darkness level metric be within a first threshold, while a second downstream computation may be less sensitive to the darkness level metric, and may thus require that that the darkness level metric be within a different threshold. While a darkness level metric is described in this example, other metrics computed by embodiments may be similarly employed.

Mask assessment circuit 955 is also configured to, upon determining that the final mask is not suitable for downstream computation: repair the DP image. Mask assessment circuit 955 is also configured to, upon determining that the final mask is not suitable for downstream computation, remove the DP image from downstream computation. Mask assessment circuit 955 may be configured to, in one embodiment, either repair the DP image, or remove the DP image from downstream computation.

Display circuit 957 is configured to display the final mask. In one embodiment, display circuit 957 is further configured to display at least one of the DP image, the true mask, a revised true mask, a metric, a threshold, or a classification of the DP image or the true mask. Displaying at least one of the DP image, the true mask, a revised true mask, a metric, a threshold, or a classification of the DP image or the true mask may also include printing at least one of the DP image, the true mask, a revised true mask, a metric, a threshold, or a classification of the DP image or the true mask. In one embodiment, display circuit 957 is configured to display at least one of the DP image, the true mask, a revised true mask, a metric, a threshold, or a classification of the DP image or the true mask according to UI 500, for example.

Figure 12:
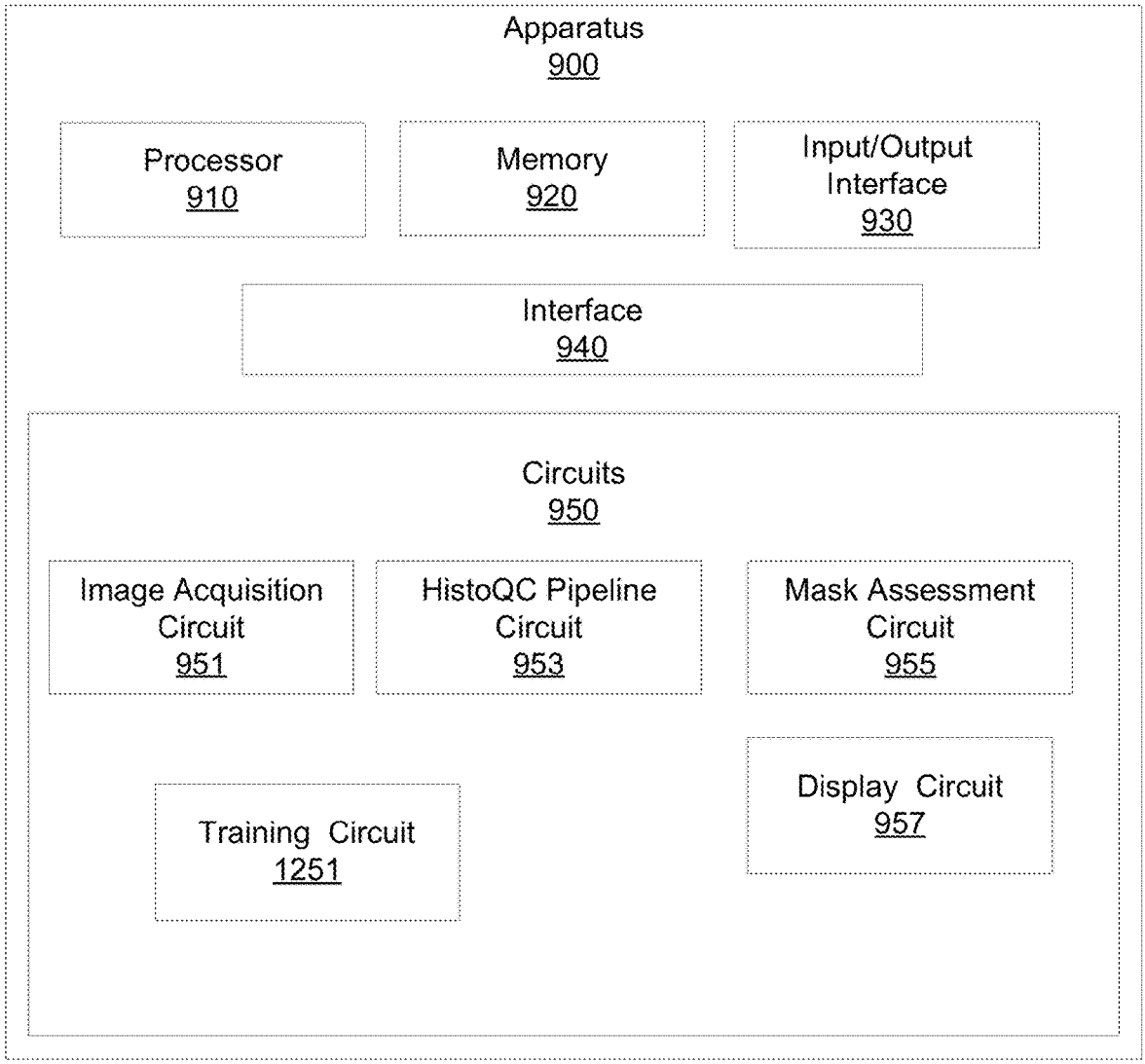
FIG. 12 illustrates an example apparatus for DP QC.

In one embodiment, apparatus 900 may also include a training circuit. FIG. 12 illustrates an embodiment of apparatus 900 that includes training circuit 1251. The training circuit 1251 may be configured to train a machine learning classifier to classify a DP image, a true mask, or a region of the DP image or true mask according to techniques described herein. In one embodiment, training circuit 1251 is configured to access a training dataset of DP images. The training dataset includes an original DP image, and a binary mask. The training circuit 1251 may be further configured to access a testing dataset of DP images, where the testing dataset includes an original DP image and a binary mask. In this embodiment, the machine learning classifier is trained and tested using the training dataset of DP images and the testing dataset of DP images. Training the machine learning classifier may include training the machine learning classifier until a threshold level of accuracy is achieved, until a threshold time has been spent training the machine learning classifier, until a threshold amount of computational resources have been expended training the machine learning classifier, or until a user terminates training. Other training termination conditions may be employed.

Figure 10:
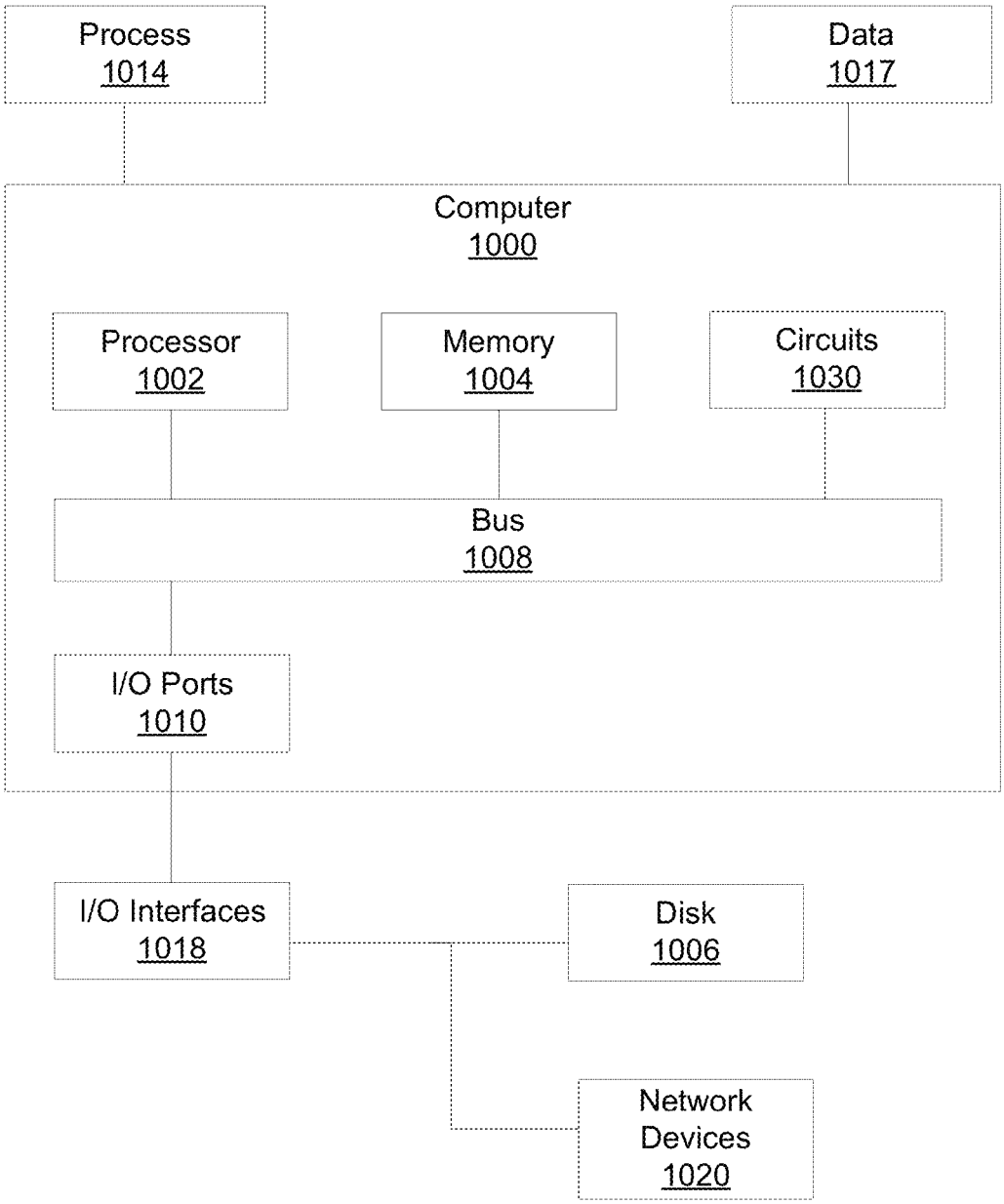
FIG. 10 illustrates an example computer in which embodiments described herein may operate.

FIG. 10 illustrates an example computer 1000 in which example methods illustrated herein can operate and in which example methods, apparatus, circuits, operations, or logics may be implemented. In different examples, computer 1000 may be part of a HistoQC system or apparatus, a digital whole slide scanner, may be operably connectable to a HistoQC system or apparatus, or a digital whole slide scanner.

Computer 1000 includes a processor 1002, a memory 1004, and input/output (I/O) ports 1010 operably connected by a bus 1008. In one example, computer 1000 may include a set of logics or circuits 1030 that perform operations for or a method of digital pathology image quality control using a machine learning classifier. Thus, the set of circuits 1030, whether implemented in computer 1000 as hardware, firmware, software, and/or a combination thereof may provide means (e.g., hardware, firmware, circuits) for performing quality control on DP images. In different examples, the set of circuits 1030 may be permanently and/or removably attached to computer 1000.

Processor 1002 can be a variety of various processors including dual microprocessor and other multi-processor architectures. Processor 1002 may be configured to perform steps of methods claimed and described herein. Memory 1004 can include volatile memory and/or non-volatile memory. A disk 1006 may be operably connected to computer 1000 via, for example, an input/output interface (e.g., card, device) 1018 and an input/output port 1010. Disk 1006 may include, but is not limited to, devices like a magnetic disk drive, a tape drive, a Zip drive, a flash memory card, or a memory stick. Furthermore, disk 1006 may include optical drives like a CD-ROM or a digital video ROM drive (DVD ROM). Memory 1004 can store processes 1014 or data 1017, for example. Data 1017 may, in one embodiment, include digitized pathology slides. Disk 1006 or memory 1004 can store an operating system that controls and allocates resources of computer 1000.

Bus 1008 can be a single internal bus interconnect architecture or other bus or mesh architectures. While a single bus is illustrated, it is to be appreciated that computer 1000 may communicate with various devices, circuits, logics, and peripherals using other buses that are not illustrated (e.g., PCIE, SATA, Infiniband, 794, USB, Ethernet).

Computer 1000 may interact with input/output devices via I/O interfaces 1018 and input/output ports 1010. Input/output devices can include, but are not limited to, CT systems, MRI systems, digital whole slide scanners, an optical microscope, a keyboard, a microphone, a pointing and selection device, cameras, video cards, displays, disk 1006, network devices 1020, or other devices. Input/output ports 1010 can include but are not limited to, serial ports, parallel ports, or USB ports.

Computer 1000 may operate in a network environment and thus may be connected to network devices 1020 via I/O interfaces 1018 or I/O ports 1010. Through the network devices 1020, computer 1000 may interact with a network. Through the network, computer 1000 may be logically connected to remote computers. The networks with which computer 1000 may interact include, but are not limited to, a local area network (LAN), a wide area network (WAN), or other networks, including the cloud.

Figure 11:
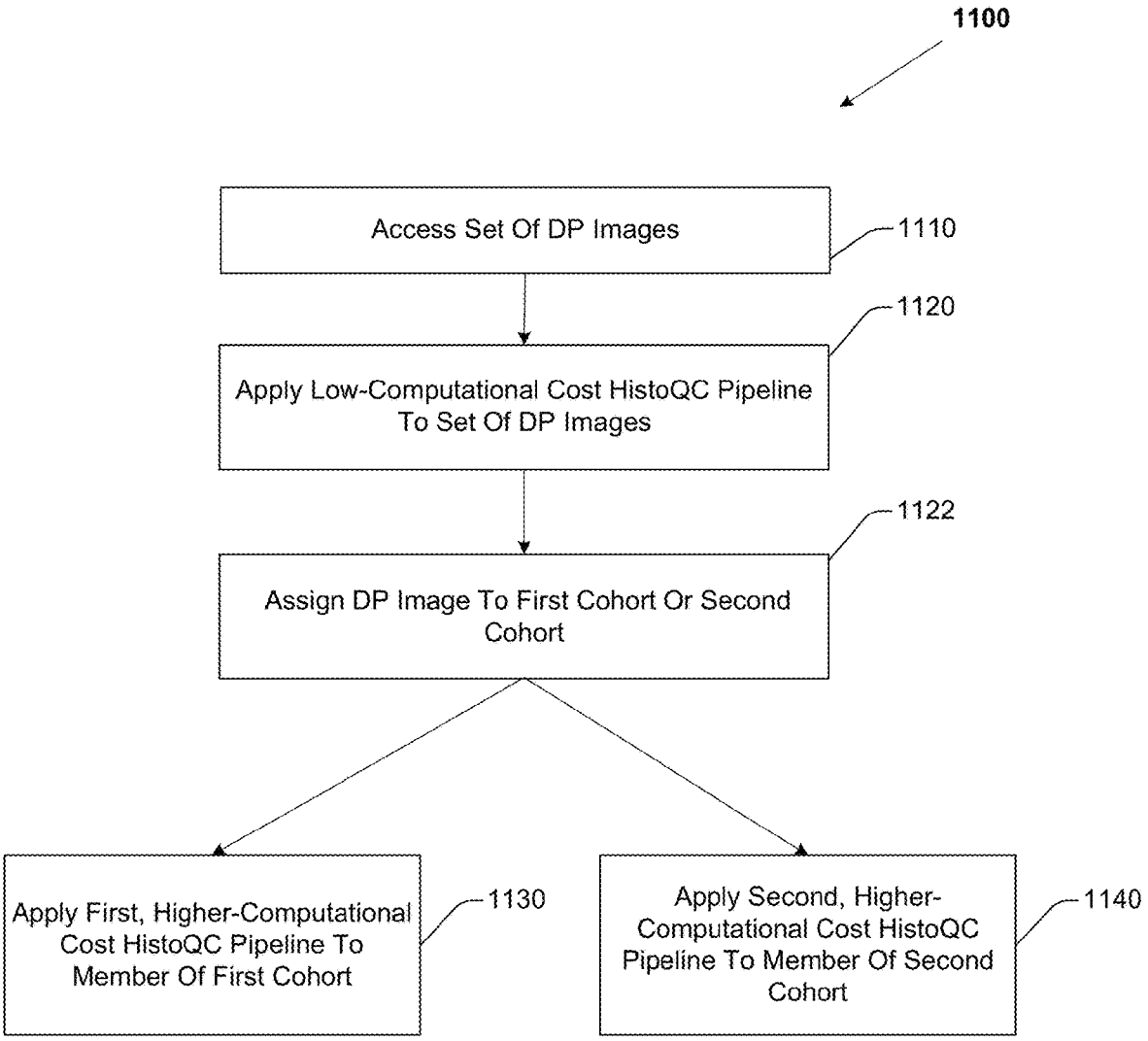
FIG. 11 illustrates an example method for performing DP QC.

FIG. 11 illustrates an example method 1100. Method 1100 includes, at 1110 accessing a set of DP images. A DP image, including a member of the set of DP images, has an imaging parameter. For example, a DP image may include metadata about the DP image, including metadata about imaging parameters used to acquire the DP image or parameters used in digitizing the DP image from a histology slice. An imaging parameter may describe, for example, the magnification at which the DP image is scanned (e.g., 40×, 20×).

The DP image has plurality of pixels. A pixel has an intensity. Accessing the DP image includes acquiring electronic data, reading from a computer file, receiving a computer file, reading from a computer memory, or other computerized activity.

Method 1100 also includes, at 1120, applying a low-computational cost histology quality control (HistoQC) pipeline to the set of DP images. The low-computational cost HistoQC pipeline computes, iteratively, a first set of image metrics, thresholds, or classifications associated with a member of the set of DP images. Applying the low-computational cost HistoQC pipeline includes acquiring electronic data, reading from a computer file, receiving a computer file, reading from a computer memory, or other computerized activity.

Method 1100 also includes, at 1122, assigning the member of the set of DP images to a first cohort or a second, different cohort. The member of the set of DP images is assigned to a cohort based, at least in part, on the imaging parameter and the first set of image metrics, thresholds, or classifications.

Method 1100 also includes, at 1130, applying a first, higher-computational-cost HistoQC pipeline to a member of the first cohort. A first, higher-computational cost HistoQC pipeline may include more modules than a lower-computational cost HistoQC pipeline, or may include modules that require more computational resources to apply to the DP image than the low-computational cost HistoQC pipeline.

Method 1100 also includes, at 1140, applying a second, different higher-computational-cost HistoQC pipeline to a member of the second cohort. A second, higher-computational-cost HistoQC pipeline may include more modules than a lower-computational cost HistoQC pipeline, or may include modules that require more computational resources to apply to the DP image than the low-computational cost HistoQC pipeline. For example, the first, higher-computational cost HistoQC pipeline or the second higher-computational cost HistoQC pipeline may include classification modules that train and apply a machine learning classifier to the DP image.

The first, higher-computational-cost HistoQC pipeline determines an artifact-free region of the member of the first cohort, and classifies the member of the first cohort as suitable for downstream computation or diagnostic analysis, or unsuitable for downstream computation or diagnostic analysis based, at least in part, on the artifact free region. The second, different, higher-computational-cost HistoQC pipeline determines an artifact-free region of the member of the second cohort, and classifies the member of the second cohort as suitable for downstream computation or diagnostic analysis, or unsuitable for downstream computation or diagnostic analysis based, at least in part, on the artifact free region. The first higher-computational cost HistoQC pipeline or the second, different higher-computational cost HistoQC pipeline may include modules, including modules that generate metrics about the DP image, modules that threshold the DP image, or modules that classify the DP image using a machine learning approach. In other embodiments, the first higher-computational cost HistoQC pipeline or the second, different higher-computational cost HistoQC pipeline may include other, different modules. Applying a low-computational HistoQC pipeline to the set of DP images, applying a first, different higher-computational-cost HistoQC pipeline to a member of the first cohort, or applying a second, different higher-computational-cost HistoQC pipeline to a member of the second cohort may including applying the HistoQC pipeline according to embodiments described herein, including operations 800.

In one embodiment, the first, higher-computational-cost HistoQC pipeline determines a presentation difference-free region of the member of the first cohort, and classifies the member of the first cohort as suitable for downstream computation or diagnostic analysis, or unsuitable for downstream computation or diagnostic analysis based, at least in part, on the presentation difference-free region. In this embodiment, the second, different, higher-computational-cost HistoQC pipeline determines a presentation difference-free region of the member of the second cohort, and classifies the member of the second cohort as suitable for downstream computation or diagnostic analysis, or unsuitable for downstream computation or diagnostic analysis based, at least in part, on the presentation difference-free region.

Examples herein can include subject matter such as an apparatus, digital pathology quality control system, a personalized medicine system, a CADx system, a processor, a system, circuitry, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for quality control of digital pathology images, according to embodiments and examples described.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable storage device storing computer-executable instructions that when executed control a processor to perform operations, the operations comprising:

accessing a digital pathology (DP) image, the DP image having a plurality of pixels, a pixel having an intensity;

accessing a histological quality control (HistoQC) pipeline, where the HistoQC pipeline includes a sequential list of N modules, N being an integer;

generating a true mask of the DP image, where the true mask indicates which pixels in the DP image are artifact free;

proceeding, starting with [the] *a* first module in the HistoQC pipeline, to, in an iterative manner:

select a module from the HistoQC pipeline; and apply the selected module to the DP image, where at least one selected module, when applied to the DP image, generates a refined true mask by refining the true mask based on the application of the selected module to the DP image, with the refined true mask acting as a true mask for a next iteration, until *the* N modules have been selected from the HistoQC pipeline;

upon determining that *the* N modules have been selected from the HistoQC pipeline:

generating a final mask based on the refined true mask, where the final mask indicates a region of the DP image that is artifact free;

upon determining that a threshold level of the DP image is artifact free based on the final mask:

declaring the DP image suitable for diagnostic analysis;

upon determining that the final mask is suitable for downstream computation:

providing the final mask for downstream computation;

upon determining that the final mask is not suitable for downstream computation:

repairing the DP image, or removing the DP image from downstream computation; and displaying the final mask.

2. The non-transitory computer-readable storage device of claim 1, where the DP image includes metadata about the DP image.

3. The non-transitory computer-readable storage device of claim 2, where the metadata includes a magnification level, a scanner type, or a microns per pixel value.

4. The non-transitory computer-readable storage device of claim 3, where accessing the HistoQC pipeline includes selecting a HistoQC pipeline from among a plurality of HistoQC pipelines based, at least in part, on the metadata.

5. The non-transitory computer-readable storage device of claim 1, where accessing the HistoQC pipeline includes accessing a configuration file.

6. The non-transitory computer-readable storage device of claim 5, where the configuration file defines a plurality of modules to apply to the DP image, and the order in which to apply the plurality of modules to the DP image.

7. The non-transitory computer-readable storage device of claim 6, where the configuration file further defines a parameter associated with a module.

8. The non-transitory computer-readable storage device of claim 1, where generating the true mask includes defining [a] *the* true mask [that indicates] *to indicate* all the pixels in the DP image are artifact free.

9. The non-transitory computer-readable storage device of claim 1, where applying the selected module to the DP image comprises:

extracting a pixel-level feature from the DP image; and generating a metric about the DP image based on the extracted *pixel-level* feature.

10. The non-transitory computer-readable storage device of claim 9, where applying the selected module to the DP image further comprises refining the true mask based on the metric.

11. The non-transitory computer-readable storage device of claim 1, where applying the selected module to the DP image comprises:

computing a pixel-level threshold based on the true mask.

12. The non-transitory computer-readable storage device of claim 11, where applying the selected module to the DP image further comprises refining the true mask based on the pixel-level threshold.

13. The non-transitory computer-readable storage device of claim 1, where applying the selected module to the DP image comprises:

providing the true mask to a machine learning classifier; and receiving, from the machine learning classifier, a classification of a region of the true mask, where the machine learning classifier generates the classification based, at least in part, on a pixel-level analysis of the true mask.

14. The non-transitory computer-readable storage device of claim 13, where applying the selected module to the DP image further comprises refining the true mask based on the classification.

15. The non-transitory computer-readable storage device of claim 13, the operations further comprising training the machine learning classifier according to a set of exemplar images, a member of the set of exemplar images having a plurality of pixels, a pixel having an intensity, where a first member of the set of exemplar images is an original image, and where [the] *a* second member of the set of exemplar images is a binary mask of the original image, where the binary mask identifies which pixels in the second member are members of a positive class, and which pixels in the second member are members of a negative class.

16. The non-transitory computer-readable storage device of claim 15, where the first member of the set of exemplar images and second member of the set of exemplar images have [the] *a* same magnification.

17. The non-transitory computer-readable storage device of claim 1, where determining that the final mask is suitable for downstream computation includes determining if the final mask includes a threshold level of artifacts, or if the final mask includes a threshold number of pixels relative to [the] *a* number of pixels in the DP image.

18. The non-transitory computer-readable storage device of claim 1, the operations further comprising:

identifying a batch effect in the DP image based, at least in part, on the final mask; and upon determining that the batch effect is above a threshold level:

correcting the batch effect, or removing the DP image from downstream computation.

19. The non-transitory computer-readable storage device of claim 18, where [a] *the* batch effect is a non-biological technical artifact occurring within a threshold percentage of [the] members of a plurality of DP images.

20. An apparatus for performing quality control of digital pathology (DP) slides, comprising:

a processor;

a memory configured to store a histological quality control (HistoQC) pipeline, and a DP image, the DP image having a plurality of pixels, a pixel having an intensity;

an input/output (I/O) interface;

a set of circuits; and an interface that connects the processor, the memory, the I/O interface, and the set of circuits, the set of circuits comprising:

an image acquisition circuit configured to:

access [a] *the* DP image, where the DP image includes metadata associated with the DP image;

define a true mask for the DP image, where the true mask indicates a region of the DP image free of artifacts;

a HistoQC pipeline circuit configured to:

access a first HistoQC pipeline, a HistoQC pipeline having a sequential list of N modules, N being an integer;

starting with [the] *a* first module in the sequential list:

select a module from the sequential list; and apply the selected module to the DP image, where applying the selected module to the DP image includes:

for at least one selected module, generating a refined true mask by refining the true mask based on the application of the module to the DP image, in an iterative manner, with the refined true mask acting as a true mask for a next iteration, until *the* N modules have been selected from the sequential list;

upon determining that *the* N modules have been selected from the sequential list:

generate a final mask based on the refined true mask, where the final mask indicates a region of the DP image that is artifact free;

a mask assessment circuit configured to:

upon determining that a threshold level of the DP image is artifact free based on the final mask:

select the DP image for diagnostic analysis;

upon determining that the final mask is suitable for downstream computation:

provide the final mask for downstream computation;

upon determining that the final mask is not suitable for downstream computation:

repair the DP image, or remove the DP image from downstream computation; and a display circuit configured to display the final mask.

21. The apparatus of claim 20, where the HistoQC pipeline includes a metric-based module, a threshold-based module, or a machine-learning classification module;

where [a] *the* metric-based module computes a metric based on the DP image;

where [a] *the* threshold-based module computes a threshold based on the DP image;

where [a] *the* machine-learning classification module generates a classification of the DP image or a region of the DP image.

22. The apparatus of claim 21, where the HistoQC pipeline circuit is further configured to:

refine the true mask based on the metric, the threshold, or the classification.

23. The apparatus of claim 20, where the DP image is a member of a plurality of DP images, and where the HistoQC pipeline circuit is further configured to detect a batch effect in the DP image.

24. The apparatus of claim 20, where the first HistoQC pipeline is a low-computational cost HistoQC pipeline; and where the HistoQC pipeline circuit is further configured to:

select, based on the metadata associated with the DP image and a first iteration of the first HistoQC pipeline to the DP image, a second, different, higher-computational cost HistoQC pipeline, and apply the second, different, higher-computational cost HistoQC pipeline to the DP image.

25. A non-transitory computer-readable storage device storing computer-executable instructions that when executed control a computer to perform a method of performing quality control on a digital pathology (DP) image, the method comprising:

accessing a set of DP images, a DP image having an imaging parameter, the DP image further having a plurality of pixels, a pixel having an intensity;

applying a low-computation cost histology quality control (HistoQC) pipeline to the set of DP images, where the low-computational cost HistoQC pipeline computes a first set of image metrics associated with a member of the set of DP images;

assigning the member of the set of DP images to a first cohort or a second, different cohort based, at least in part, on the imaging parameter and the first set of image metrics;

applying a first, higher-computational-cost HistoQC pipeline to a member of the first cohort;

applying a second, different [higher-computation-cost] *higher-computational-cost* HistoQC pipeline to a member of the second, *different* cohort;

where the first, higher-computational-cost HistoQC pipeline determines an artifact-free region of the member of the first cohort, and classifies the member of the first cohort as suitable for downstream computation or diagnostic analysis, or unsuitable for downstream computation or diagnostic analysis based, at least in part, on the artifact free region; and where the second, different[,] higher-computational-cost HistoQC pipeline determines an artifact-free region of the member of the second, *different* cohort, and classifies the member of the second, *different* cohort as suitable for downstream computation or diagnostic analysis, or unsuitable for downstream computation or diagnostic analysis based, at least in part, on the artifact free region.

*26. A method, comprising:*

*using a computing system, applying a sequential pipeline of modules to a digital pathology image to generate a final true mask of the digital pathology image, the final true mask indicating which pixels of the digital pathology image are free of artifacts, at least some of the modules in the sequential pipeline of modules refining an initial true mask into the final true mask; and*

*displaying one or more descriptors of the final true mask.*

*27. The method of claim 26, further comprising gathering metrics descriptive of the digital pathology image, the final true mask, the initial true mask, or a refined true mask in at least one module of the sequential pipeline of modules.*

*28. A non-transitory computer-readable storage device storing computer-executable instructions that cause the computing system to perform the method of claim 26.*

*29. A method, comprising:*

*using a computing system, applying a sequential pipeline of modules to a cohort of digital pathology images to generate at least one metric descriptive of each of the digital pathology images in the cohort and a final true mask for each of the digital pathology images in the cohort, the final true mask indicating which pixels of the digital pathology image are free of artifacts; and*

*displaying at least the at least one metric in an interactive graphical user interface or in a report in such a way as to allow an identification or a description of outliers and batch effects among the cohort of digital pathology images.*

*30. The method of claim 29, further comprising displaying the final true mask in the interactive graphical user interface.*

*31. A non-transitory computer-readable storage device storing computer-executable instructions that cause the computing system to perform the method of claim 29.*

* * * * *